United States Patent
Suzuki et al.

(10) Patent No.: US 12,151,326 B2
(45) Date of Patent: Nov. 26, 2024

(54) MACHINING APPARATUS

(71) Applicant: CANON DENSHI KABUSHIKI KAISHA, Saitama (JP)

(72) Inventors: Hitoshi Suzuki, Saitama (JP); Seiichi Matsumaru, Kanagawa (JP); Suguru Fujiu, Tokyo (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 578 days.

(21) Appl. No.: 17/482,956

(22) Filed: Sep. 23, 2021

(65) Prior Publication Data

US 2022/0009009 A1 Jan. 13, 2022

Related U.S. Application Data

(63) Continuation of application No. PCT/JP2020/013171, filed on Mar. 24, 2020.

(30) Foreign Application Priority Data

Mar. 26, 2019 (JP) ................. 2019-058663
Jan. 20, 2020 (JP) ................. 2020-007125

(51) Int. Cl.
*B23Q 3/157* (2006.01)
*B23C 1/00* (2006.01)
(Continued)

(52) U.S. Cl.
CPC .............. *B23Q 1/488* (2013.01); *B23C 1/002* (2013.01); *B23C 1/06* (2013.01); *B23C 1/14* (2013.01);
(Continued)

(58) Field of Classification Search
CPC ........... B23Q 1/015; B23Q 1/01–1/017; B23Q 1/5406; B23Q 1/488; B23Q 1/621;
(Continued)

(56) References Cited

U.S. PATENT DOCUMENTS 3,874,071 A 4/1975 Kato ............................... 29/568
9,700,975 B2 7/2017 Kelkar .................. B23Q 1/015
(Continued)

FOREIGN PATENT DOCUMENTS

CN 1145840 3/1997
CN 202665727 U 1/2013
(Continued)

OTHER PUBLICATIONS

English translation of International Search Report in Counterpart International Application No. PCT/JP2020/013171, Jun. 30, 2020.*
(Continued)

*Primary Examiner* — Erica E Cadugan
(74) *Attorney, Agent, or Firm* — Venable LLP

(57) ABSTRACT

A machining apparatus includes a first frame including a first surface formed along a Z-axis direction and a second surface formed along a Y-axis direction. An X-axis moving mechanism and a Z-axis moving mechanism are disposed on the first surface side of the first frame. A Y-axis moving mechanism is disposed on the second surface side of the first frame. A second frame supports the first frame from the second surface side of the first frame. An A-axis rotating mechanism, a B-axis rotating mechanism, and a supporting mechanism that supports an object to be machined are moved by the Y-axis moving mechanism. The t Y-axis moving mechanism is disposed in a space located below the first frame in the Z-axis direction, and formed by the second flame.

9 Claims, 27 Drawing Sheets

(51) Int. Cl.
*B23C 1/06* (2006.01)
*B23C 1/14* (2006.01)
*B23Q 1/01* (2006.01)
*B23Q 1/48* (2006.01)
*B23Q 1/62* (2006.01)
*B23Q 3/155* (2006.01)
*B23Q 17/00* (2006.01)

(52) U.S. Cl.
CPC ............ *B23Q 1/015* (2013.01); *B23Q 1/621* (2013.01); *B23Q 3/15526* (2013.01); *B23Q 3/15536* (2016.11); *B23Q 3/15706* (2013.01); *B23Q 17/002* (2013.01); *B23Q 2003/15537* (2016.11); *B23Q 2220/004* (2013.01); *Y10T 409/305768* (2015.01); *Y10T 409/305824* (2015.01); *Y10T 409/308288* (2015.01); *Y10T 409/30896* (2015.01); *Y10T 409/309576* (2015.01); *Y10T 483/1793* (2015.01); *Y10T 483/18* (2015.01)

(58) Field of Classification Search
CPC .. B23Q 2220/004; B23Q 1/4857; B23C 1/06; B23C 1/002; B23C 1/14; B23C 2220/32; Y10T 409/307728; Y10T 409/308288; Y10T 409/309576; Y10T 408/91; Y10T 29/5109; Y10T 29/5114; Y10T 409/305656–305824; Y10T 409/308792; Y10T 409/30896; Y10T 408/545; B23B 39/006; B23B 3/065; B23B 3/162; B23B 3/165; B23B 3/168; B23B 11/00; B24B 7/005; B24B 7/224; B23K 37/0235; A61C 13/0004
USPC ....... 409/202, 212, 235, 165–168, 221, 224; 408/234, 71; 29/27 R, 27 C
See application file for complete search history.

(56) References Cited

U.S. PATENT DOCUMENTS

| | | | | |
|---|---|---|---|---|
| 10,172,694 | B2* | 1/2019 | Isobe | A61C 13/082 |
| 2004/0102297 | A1* | 5/2004 | Quak | B23Q 39/024 |
| | | | | 409/198 |
| 2009/0160388 | A1* | 6/2009 | Zagromski | G05B 19/409 |
| | | | | 318/570 |
| 2015/0174716 | A1 | 6/2015 | Suyama | B23Q 3/06 |
| 2017/0001273 | A1 | 1/2017 | Kelkar | B23Q 1/488 |
| 2019/0084102 | A1 | 3/2019 | Jeannerat et al. | B23Q 1/488 |
| 2020/0078888 | A1* | 3/2020 | Lee | B23C 1/02 |

FOREIGN PATENT DOCUMENTS

| | | | | |
|---|---|---|---|---|
| CN | 106078234 | | 11/2016 | |
| CN | 205764952 | U | 12/2016 | |
| CN | 107150263 | | 9/2017 | |
| CN | 108311904 | | 7/2018 | |
| DE | 10238372 | A1 * | 3/2004 | ............ B23Q 1/015 |
| DE | 10 2005 039818 | | 3/2007 | |
| DE | 20 2017 102297 | U1 | 7/2017 | |
| JP | 61-050757 | A * | 3/1986 | |
| JP | H10-058210 | | 3/1998 | |
| JP | 2000-308936 | | 11/2000 | |
| JP | 2001-025932 | | 1/2001 | |
| JP | 2004-276161 | | 10/2004 | |
| JP | 2007-215854 | | 8/2007 | |
| JP | 2009-023076 | | 2/2009 | |
| JP | 2014-056537 | | 3/2014 | |
| JP | 3194870 | U | 12/2014 | |
| JP | 2015-120222 | | 7/2015 | |
| JP | 2015-178169 | | 10/2015 | |
| JP | 2017-505720 | | 2/2017 | |
| JP | 2018-001323 | | 1/2018 | |
| JP | 2018-030192 | | 3/2018 | |
| JP | 2018-034266 | | 3/2018 | |
| JP | 2022164488 | A * | 10/2022 | |
| JP | 2023026326 | A * | 2/2023 | |
| JP | 2023026357 | A * | 2/2023 | |
| KR | 100971168 | B1 | 7/2010 | |
| KR | 10-1334524 | B1 * | 11/2013 | |
| KR | 10-1589550 | | 1/2016 | |
| WO | 2011/111902 | | 9/2011 | |

OTHER PUBLICATIONS

English translation of Written Opinion in Counterpart International Application No. PCT/JP2020/013171, Jun. 30, 2020.*
Extended European Search Report dated Nov. 14, 2022 in counterpart EP Application No. EP20779737.4.
Office Action dated Dec. 13, 2022 in counterpart Japanese Application No. 2021-509472, together with English translation thereof.
Office Action dated May 16, 2023 in counterpart Japanese Application No. 2021-509472, together with English translation thereof.
Office Action dated Feb. 21, 2023 in counterpart Chinese Application No. 202080023876.1, together with English translation thereof.

* cited by examiner

FIG.6
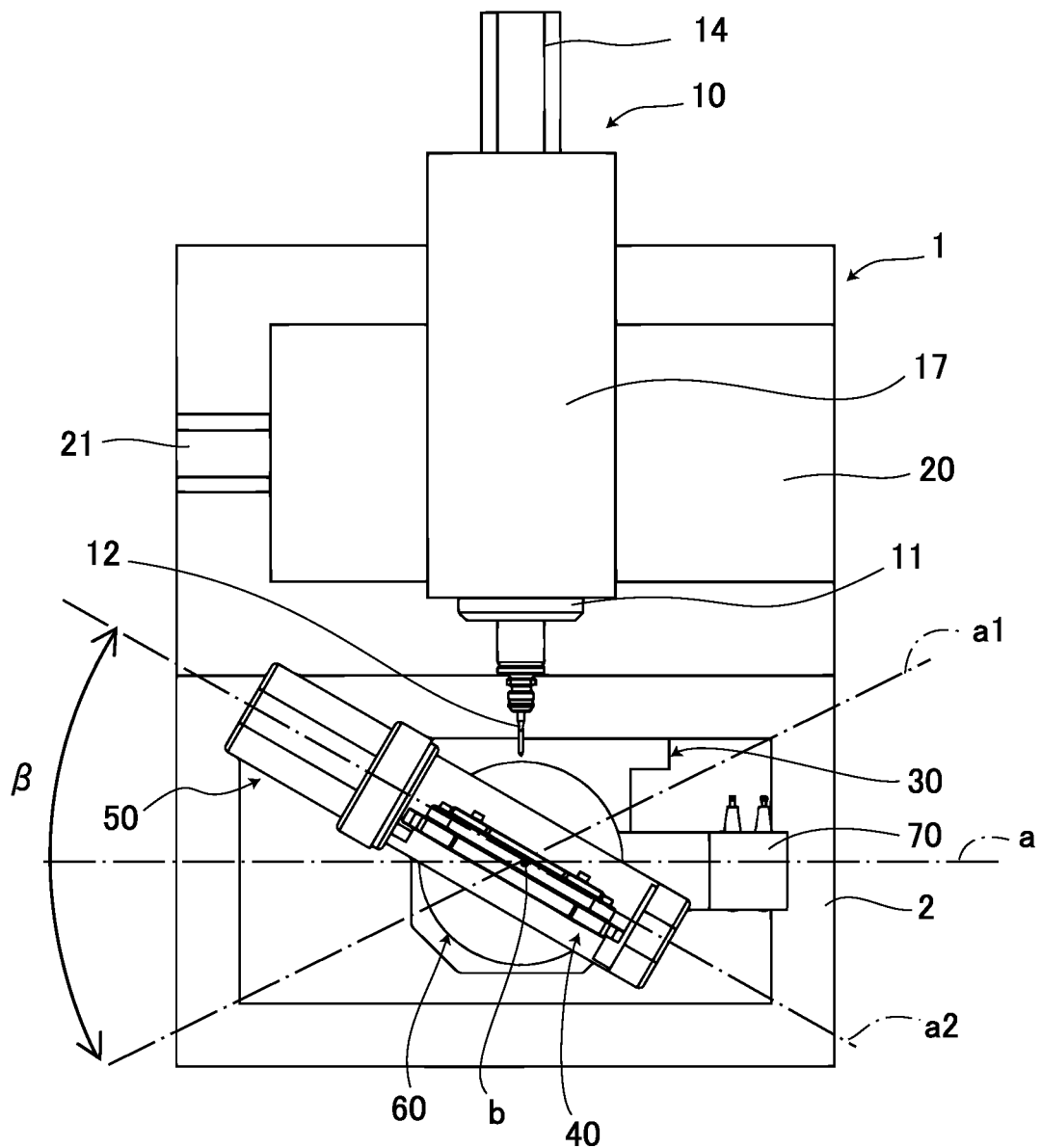
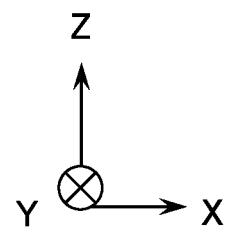

MACHINING APPARATUS

CROSS-REFERENCE TO RELATED APPLICATIONS

This application is a Continuation of International Patent Application No. PCT/JP2020/013171, filed Mar. 24, 2020, which claims the benefit of Japanese Patent Application No. 2019-058663, filed Mar. 26, 2019, and Japanese Patent Application No. 2020-007125, filed Jan. 20, 2020, both of which are hereby incorporated by reference herein in their entirety.

BACKGROUND OF THE INVENTION

Field of the Invention

The present invention relates to a machining apparatus that machines an object.

Background Art

A known machining apparatus rotates a spindle to which a machining tool is attached, and performs an operation, such as a cutting operation, on an object (workpiece) (for example, see Patent Literature 1). In the configuration described in Patent Literature 1, the workpiece is moved and rotated while supported by a side surface of a frame of the apparatus.

CITATION LIST

Patent Literature

Patent Literature 1: Japanese Patent Application Publication No. 2018-30192

In the configuration described in Patent Literature 1, since the workpiece is moved and rotated while supported by the side surface of the frame of the apparatus, it is difficult to ensure the rigidity required for supporting the workpiece. If the rigidity of portions that support the workpiece and the spindle is insufficient, the machining stability may deteriorate. If the machining stability deteriorates, the sufficient machining accuracy for the workpiece may not be ensured.

SUMMARY OF THE INVENTION

A machining apparatus includes a first frame including a first surface formed along a Z-axis direction and a second surface formed along a Y-axis direction, an X-axis moving mechanism disposed on the first surface side of the first frame, a Z-axis moving mechanism disposed on the first surface side of the first frame, a Y-axis moving mechanism disposed on the second surface side of the first frame, a second frame configured to support the first frame from the second surface side of the first frame, an A-axis rotating mechanism configured to be moved by the Y-axis moving mechanism, a B-axis rotating mechanism configured to be moved by the Y-axis moving mechanism, and a supporting mechanism configured to be moved by the Y-axis moving mechanism and support an object to be machined. The Y-axis moving mechanism is disposed in a space located below the first frame in the Z-axis direction and formed by the second frame. The first frame is configured to support the X-axis moving mechanism, Y-axis moving mechanism and Z-axis moving mechanism.

Further features of the present invention will become apparent from the following description of exemplary embodiments with reference to the attached drawings.

BRIEF DESCRIPTION OF DRAWINGS

FIG. 6 is a front view of the machining apparatus of the first embodiment, in which view a workpiece is rotated on a b-axis and inclined.

DESCRIPTION OF THE EMBODIMENTS

First Embodiment

Figure 1:
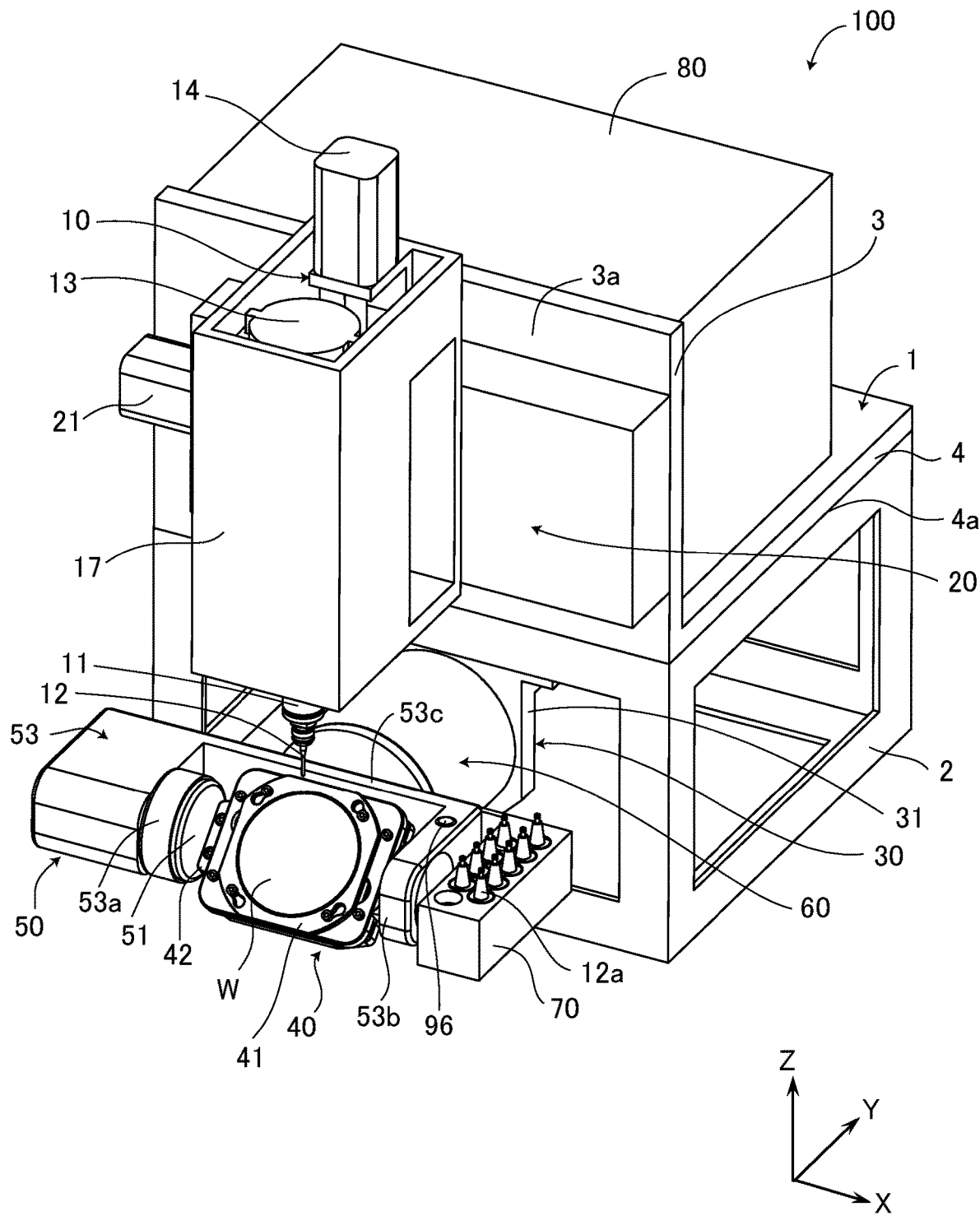
FIG. 1 is a perspective view of a machining apparatus of a first embodiment.

A first embodiment will be described with reference to FIGS. 1 to 16. First, an overall configuration of a machining apparatus 100 of the present embodiment will be described with reference to FIGS. 1 to 6.

Machining Apparatus

The machining apparatus 100 includes a frame 1 that serves as a moving-mechanism supporting member, a first moving mechanism 10, a second moving mechanism 20, and a third moving mechanism 30. The first to the third moving mechanisms 10 to 30 are supported by the frame 1. The machining apparatus 100 also includes a supporting mechanism 40 that supports a workpiece W to be machined, a first rotating mechanism (a rotating mechanism) 50, a second rotating mechanism (another rotating mechanism) 60, a tool magazine 70, and an electric unit 80. The first and the second rotating mechanisms can rotate the supporting mechanism 40.

Figure 4:
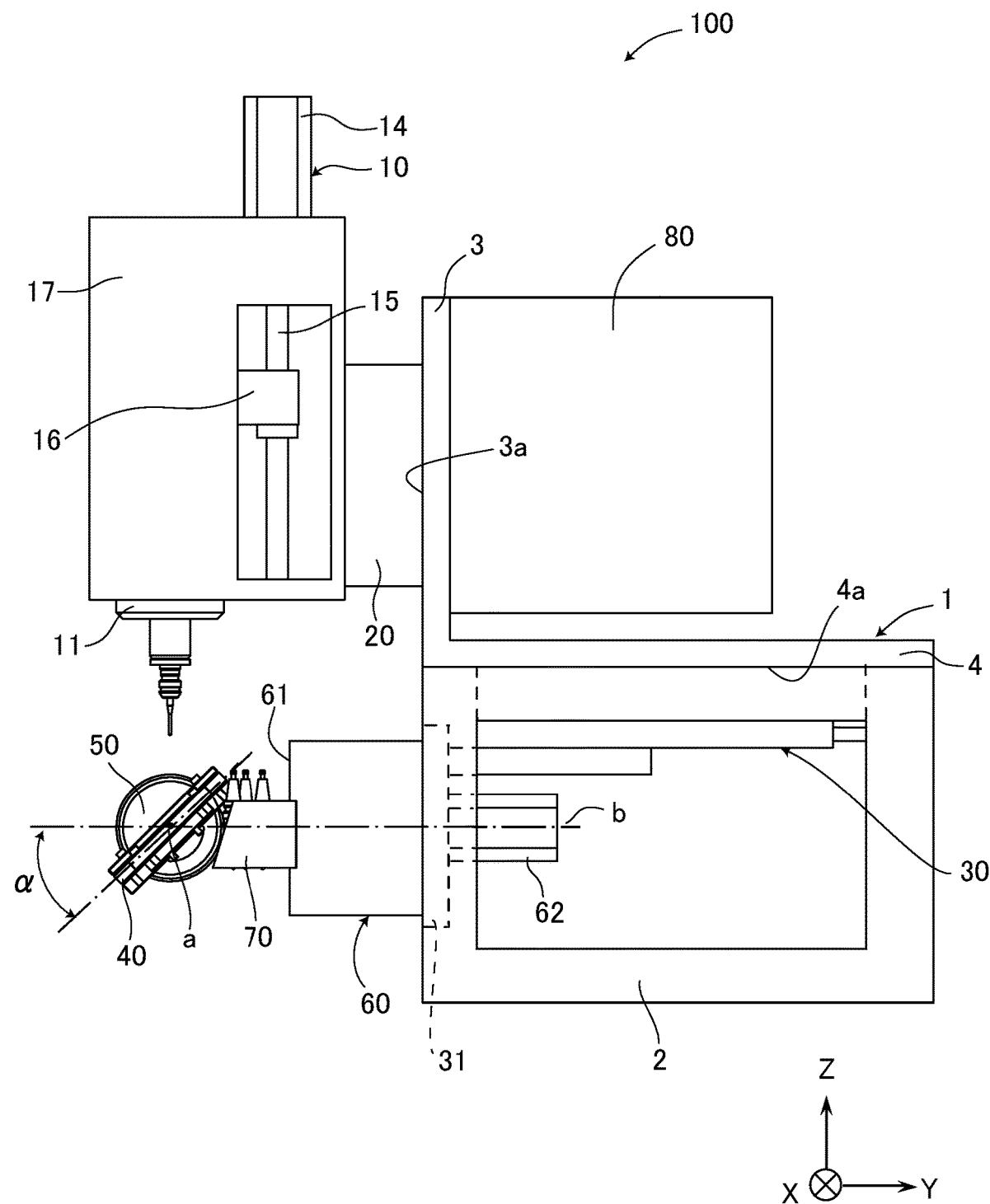
FIG. 4 is a side view of the machining apparatus of the first embodiment, in which view one portion of the machining apparatus is cut.

The frame 1 that serves as a first frame is placed on a stand 2, which has a cavity (space) and serves as a second frame. As illustrated in FIG. 4, the frame 1 includes a first portion 3 and a second portion 4, and the second portion 4 is bent from an edge portion of the first portion 3 at a right angle. In the present embodiment, the first portion 3 is disposed along the vertical direction, and the second portion 4 is disposed along the horizontal direction. A surface (left surface in FIG. 4) of the first portion 3 located on a side opposite to a side on which the second portion 4 is bent serves as a first surface 3a. In addition, a surface (lower surface in FIG. 4) of the second portion 4 located on a side opposite to a side on which the first portion 3 is disposed serves as a second surface 4a. The first surface 3a and the second surface 4a are orthogonal to each other. The first surface 3a corresponds to a first surface extending along a Z-axis direction, and the second surface 4a corresponds to a second surface extending along a Y-axis direction. The stand 2 supports the frame 1 from the second surface 4a side of the frame 1.

The first moving mechanism 10 that serves as a Z-axis moving mechanism is supported by the first surface 3a of the first portion 3 of the frame 1 via the second moving mechanism 20, and can move a spindle 11 in the Z-axis direction (vertical direction, first direction). To the spindle 11, a machining tool 12 is detachably attached via a tool holder. The spindle 11 is driven and rotated by a motor 13. As illustrated in FIG. 4, the first moving mechanism 10 includes a motor 14 and a guide shaft 15 disposed in the Z-axis direction. Thus, when driven by the motor 14, the first moving mechanism 10 causes the spindle 11 to reciprocate (move up and down) along the guide shaft 15 in the Z-axis direction. The spindle 11 is movably supported by the guide shaft 15 via a Z-axis supporting member 16. For example, the guide shaft 15 is a ball screw, and the Z-axis supporting member 16 is a member that moves along the guide shaft 15, which is rotated by the motor 14. The guide shaft 15 and the Z-axis supporting member 16 are covered with a cover 17.

The second moving mechanism 20 that serves as an X-axis moving mechanism is supported by the first surface 3a of the first portion 3 of the frame 1, and can move the spindle 11 and the first moving mechanism 10 in an X-axis direction (horizontal direction, second direction) orthogonal to the Z-axis direction. The second moving mechanism 20 includes a motor 21 and a guide shaft (not illustrated) disposed in the X-axis direction. Thus, when driven by the motor 21, the second moving mechanism 20 causes the first moving mechanism 10 to reciprocate along the guide shaft in the X-axis direction. As in the first moving mechanism 10, in the second moving mechanism 20, the guide shaft may be a ball screw.

Figure 5A:
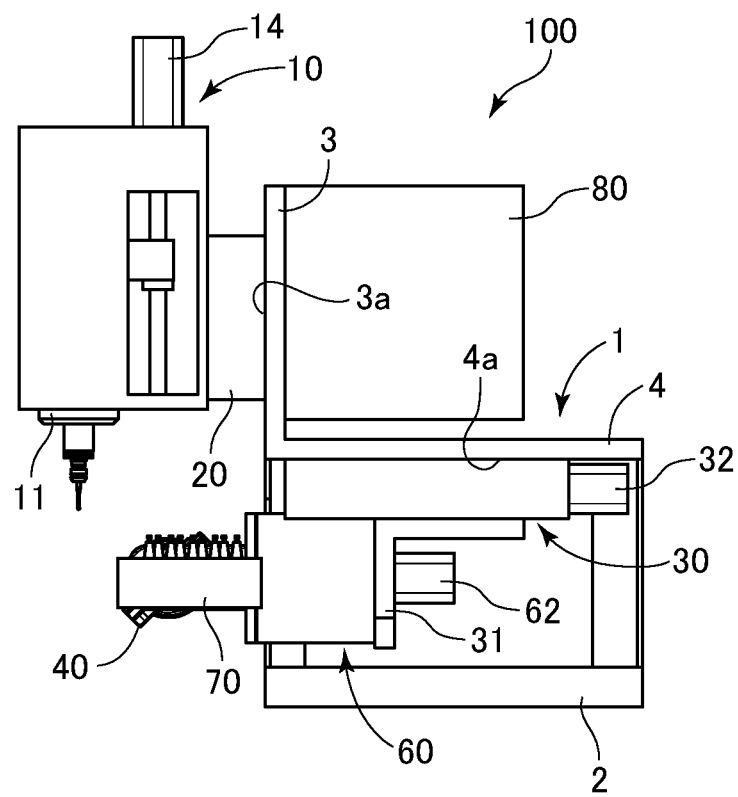
FIG. 5A is a side view of the machining apparatus of the first embodiment, in which view one portion of a stand is cut.
Figure 5B:
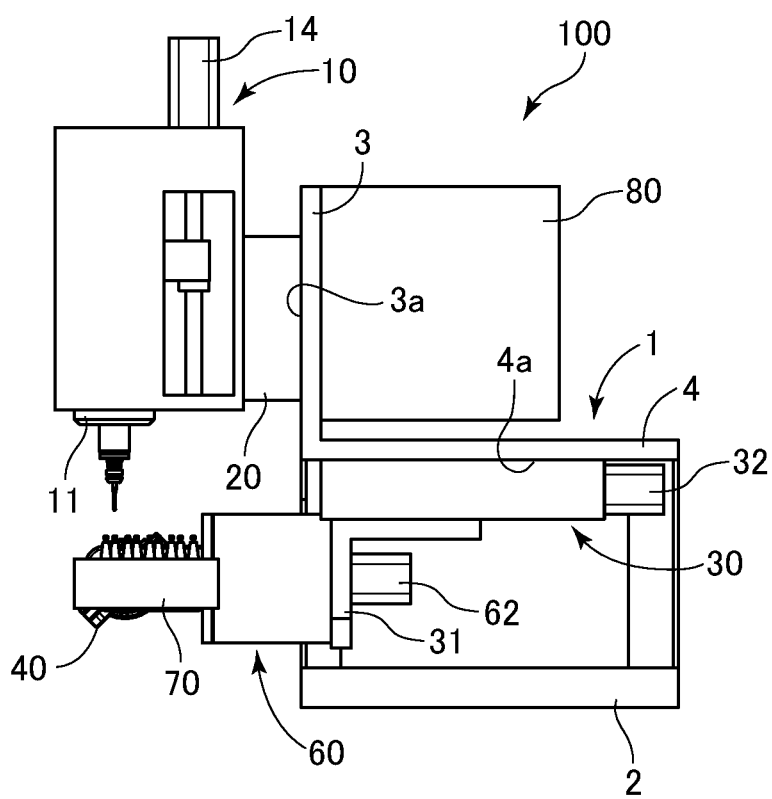
FIG. 5B is a side view of the machining apparatus of the first embodiment, in which view one portion of the stand is cut in a state where a supporting mechanism is moved from the state of FIG. 5A in a Y-axis direction.

The third moving mechanism 30 that serves as a Y-axis moving mechanism is supported by the second surface 4a of the second portion 4 of the frame 1, and can move the supporting mechanism 40 in a Y-axis direction (horizontal direction, third direction) orthogonal to the Z-axis direction and the X-axis direction. The third moving mechanism 30 includes a motor 32 (FIG. 5A, FIG. 5B) and a guide shaft (not illustrated) disposed in the Y-axis direction. Thus, when driven by the motor, the third moving mechanism 30 causes the supporting mechanism 40 to reciprocate along the guide shaft in the Y-axis direction. As in the first moving mechanism 10, in the third moving mechanism 30, the guide shaft may be a ball screw. As illustrated in FIGS. 5A and 5B, the third moving mechanism 30 is disposed in a space located below the frame 1 in the Z-axis direction, and formed by the stand 2. In addition, a guide plane of the third moving mechanism 30 is positioned, in the Z-axis direction, above a later-described rotation center axis (a-axis) of the first rotating mechanism 50 and a rotation center axis (b-axis) of the second rotating mechanism 60.

Figure 3:
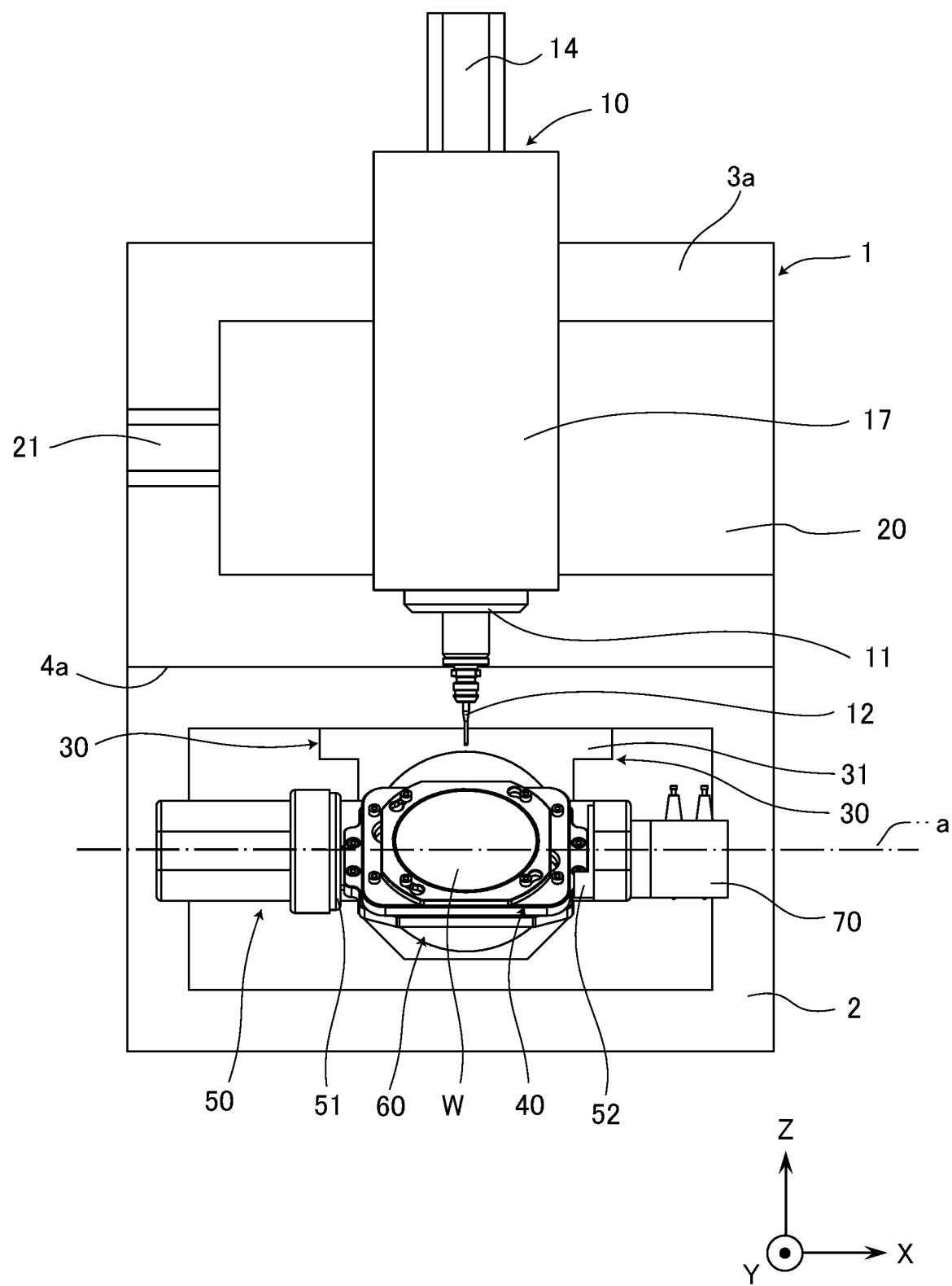
FIG. 3 is a front view of the machining apparatus of the first embodiment.

The third moving mechanism 30 also includes a supporting plate portion 31 that supports the second rotating mechanism 60. As illustrated in FIGS. 5A and 5B, the supporting plate portion 31 reciprocates along the guide shaft in the Y-axis direction. As illustrated in FIGS. 1 and 3, since a portion of the stand 2 on the supporting mechanism 40 side in the Y-axis direction is opened, the supporting plate portion 31 and the second rotating mechanism 60 supported by the supporting plate portion 31 do not interfere with the stand 2 even when the supporting plate portion 31 and the second rotating mechanism 60 move in the Y-axis direction. As described in detail later, the third moving mechanism 30 can move the supporting mechanism 40 as well as the second rotating mechanism 60 and the first rotating mechanism 50, in the Y-axis direction.

The supporting mechanism 40 supports a workpiece W, such as a dental prosthesis, that is an object to be cut by the machining tool 12. The supporting mechanism 40 includes a holding portion 41 and a supporting portion 42. The holding portion 41 holds the workpiece W. Both edge portions of the supporting portion 42 are linked with rotary portions 51 and 52 of the first rotating mechanism 50, and the supporting portion 42 supports the workpiece W via the holding portion 41. The holding portion 41 and the supporting portion 42 are components separate from each other. As described in detail later, the holding portion 41 is fixed on the supporting portion 42. However, the holding portion 41 may be integrated with the supporting portion 42.

The first rotating mechanism 50 that serves as an A-axis rotating mechanism can rotate the supporting mechanism 40 on the a-axis (see FIGS. 2 to 4 and FIG. 6), which serves as a rotation axis orthogonal to the Z-axis direction. In the present embodiment, the a-axis is parallel with the X-axis direction. The first rotating mechanism 50 includes a supporting frame 53 that rotatably supports the rotary portions 51 and 52, and a motor 54 (FIG. 11) that rotates the rotary portion 51. The supporting frame 53 is nearly U-shaped so as to surround the supporting mechanism 40, and includes a first supporting portion 53a that supports the motor 54 and the rotary portion 51, a second supporting portion 53b that supports the rotary portion 52, and a linking portion 53c that links the first supporting portion 53a and the second supporting portion 53b.

The rotary portion 51 supported by the first supporting portion 53a and the rotary portion 52 supported by the second supporting portion 53b are disposed so as to face each other in the a-axis direction and be able to rotate on the a-axis that serves as a rotation axis. Both edge portions of the supporting mechanism 40 in the a-axis direction are supported by the rotary portions 51 and 52. In this configuration, the first rotating mechanism 50 supports the supporting mechanism 40 such that the supporting mechanism 40 can rotate on the a-axis by α°, as illustrated in FIG. 4.

The first rotating mechanism 50 can rotate by at least 180°. Thus, the first rotating mechanism 50 can turn the workpiece W, upside down, supported by the supporting mechanism 40. In the present embodiment, the first rotating mechanism 50 can rotate the supporting mechanism 40 by 360° on the a-axis. As described in detail later, since the extension line of the a-axis passes through a center of the workpiece W (supported by the supporting mechanism 40) that is a center in the thickness direction of the workpiece W, the distance between the a-axis (that is, the rotation center axis) and the front surface and the distance between the a-axis and the back surface are the same as each other. Thus, even when the workpiece W is turned upside down, the positional relationship between the center of the workpiece W in the thickness direction and the machining tool 12 is unchanged.

The second rotating mechanism 60 that serves as a B-axis rotating mechanism can rotate the supporting mechanism 40 on the b-axis (see FIGS. 4 and 5), which serves as another rotation axis orthogonal to the Z-axis direction and the a-axis. In the present embodiment, the b-axis is parallel with the Y-axis direction. The second rotating mechanism 60 includes a rotary portion 61 (FIG. 11) to which the supporting frame 53 of the first rotating mechanism 50 is attached, and a motor 62 (FIG. 4) that rotates the rotary portion 61. The rotary portion 61 is a portion to which the linking portion 53c of the supporting frame 53 is attached. When driven and rotated by the motor 62, the rotary portion 61 can rotate the supporting frame 53 on the b-axis. Thus, the second rotating mechanism 60 supports the first rotating mechanism 50 and the supporting mechanism 40 such that the first rotating mechanism 50 and the supporting mechanism 40 can rotate on the b-axis by β°, as illustrated in FIG. 6.

The b-axis passes through a center portion located between the rotary portion 51 and the rotary portion 52 of the first rotating mechanism 50 in the X-axis direction. In addition, the extension line of the b-axis passes through a center of the workpiece W (supported by the supporting mechanism 40) located in the X-axis direction. As illustrated in FIGS. 4 and 6, the a-axis and the b-axis intersect with each other at a right angle. Thus, the a-axis can rotate on the b-axis. For example, the a-axis swings from an a1 axis to an a2 axis, as illustrated in FIG. 6.

Figure 2:
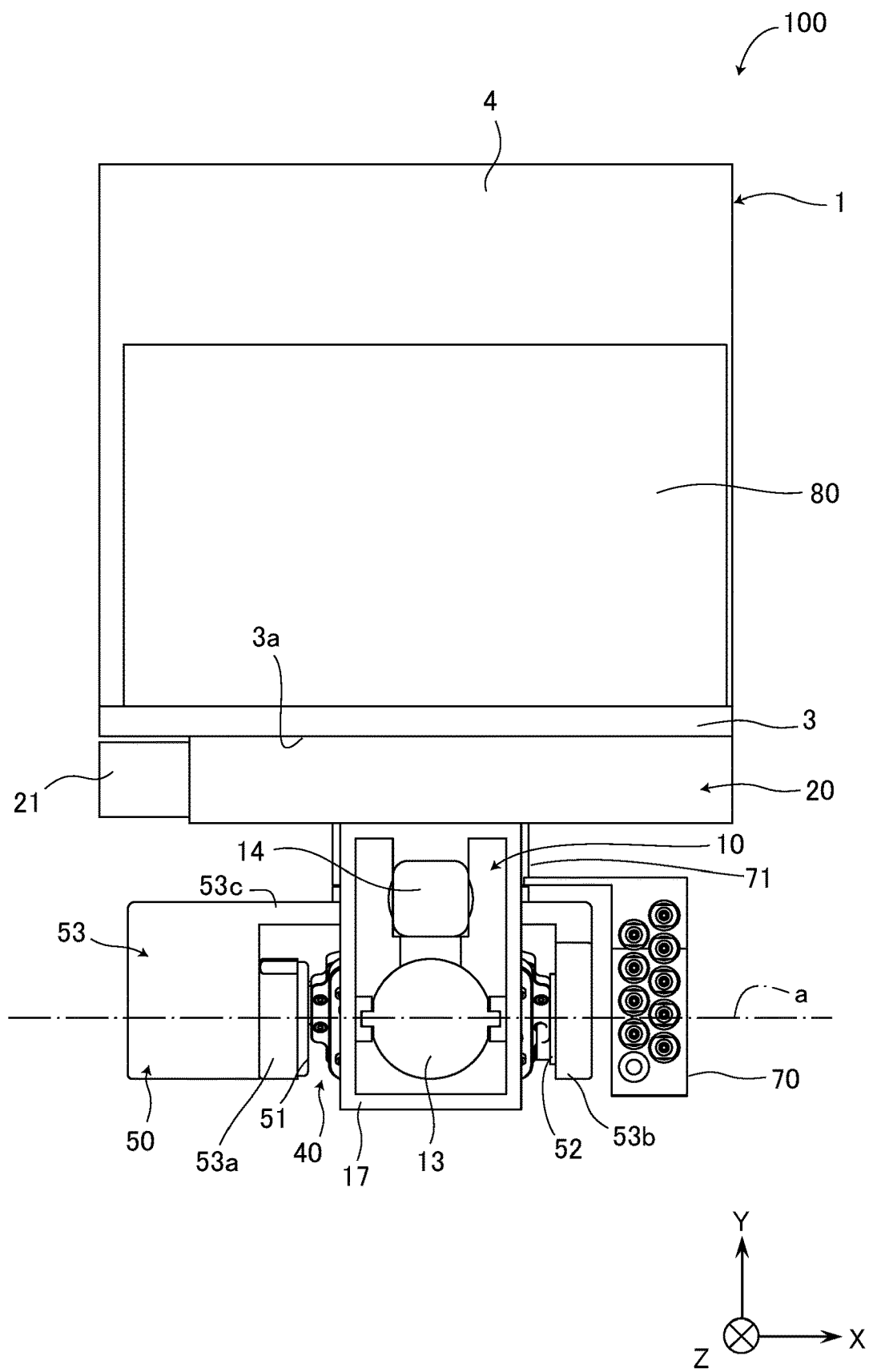
FIG. 2 is a top view of the machining apparatus of the first embodiment.

The tool magazine 70 that serves as a tool holding portion can hold a plurality of machining tools. The tool magazine 70 is disposed adjacent to the first rotating mechanism 50, and is supported by a supporting member 71, as illustrated in FIG. 2. The supporting member 71 is supported by the supporting plate portion 31 of the third moving mechanism 30. Thus, the tool magazine 70 can be moved by the third moving mechanism 30 in the Y-axis direction, together with the supporting mechanism 40 and the like. However, even if the supporting mechanism 40 rotates on the a-axis as illustrated in FIG. 4, the tool magazine 70 does not rotate. In addition, even if the supporting mechanism 40 rotates on the b-axis as illustrated in FIG. 6, the tool magazine 70 does not rotate. That is, even if the supporting mechanism 40 rotates on the a-axis and the b-axis, the tool magazine 70 is supported by the supporting member 71 such that the tool magazine 70 keeps a predetermined posture.

In the tool magazine 70, a plurality of types of machining tools are held, and arranged in a plurality of lines along the Y-axis direction. Each machining tool is integrated with a corresponding tool holder 12a. Thus, a machining tool attached to the spindle 11 can be replaced with another machining tool. Note that the tool holder 12a is to be held by the spindle 11, and may be integrated with the machining tool, or may be a component separate from the machining tool. Note that in the present embodiment, a double-chuck configuration is used. That is, the machining tool 12 is attached to the tool holder 12a that has a chuck, and the machining tool 12 is held by a chuck portion (for holding a tool) of the spindle 11 via the tool holder 12a. However, the machining tool may be directly attached to the spindle 11. The replacement of the machining tool may be performed by a worker, or may be automatically performed by the machining apparatus 100.

When the replacement of the machining tool is automatically performed, the second moving mechanism 20 and the third moving mechanism 30 move an empty space (that contains no machining tool) of the tool magazine 70 to a position located under the spindle 11. Then the first moving mechanism 10 lowers the spindle 11; removes the machining tool 12 attached to the spindle 11, by operating an attaching and detaching apparatus, such as a chuck, disposed in the spindle 11; and disposes the machining tool 12 in the empty space of the tool magazine 70. Then the first moving mechanism 10 lifts the spindle 11, and the second moving mechanism 20 and the third moving mechanism 30 move a position at which a target machining tool 12 of the tool magazine 70 is disposed, to a position located under the spindle 11. Then the first moving mechanism 10 lowers the spindle 11 again and operates the attaching and detaching apparatus, and thereby attaches the target machining tool 12 to the spindle 11. Note that the machining tool 12 is a drill or an end mill, for example.

The electric unit 80 is fixed inside the frame 1. That is, the electric unit 80 is disposed on a side of the first portion 3 opposite to the first surface 3a, and on a side of the second portion 4 opposite to the second surface 4a. In this manner, the electric unit 80 is disposed in the inside of the L-shaped frame 1 in which the moving mechanisms and the rotating mechanisms are not disposed. Thus, the space can be effectively used and the apparatus can be downsized.

Figure 7:
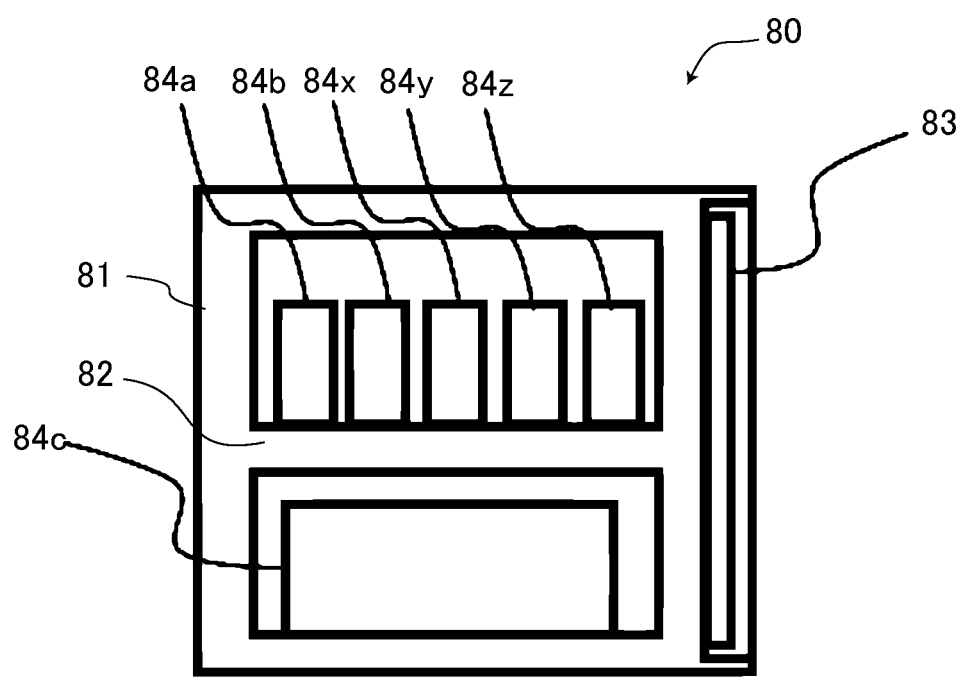
FIG. 7 is a schematic cross-sectional view of an electric unit of the first embodiment.

The electric unit 80 controls the machining apparatus 100. As illustrated in FIG. 7, in the electric unit 80, a control board 83, and control portions 84a, 84b, 84c, 84x, 84y, and 84z are supported by a frame 81. The control board 83 controls the spindle and the motor of each axis. Each of the control portions 84a, 84b, 84c, 84x, 84y, and 84z determines pulses to be output to a corresponding motor, from a signal sent from a rotary encoder of the motor; and appropriately controls the rotation of the motor.

Specifically, the control portion 84a controls the motor 54 of the first rotating mechanism 50, and rotates the supporting mechanism 40 on the a-axis. The control portion 84b controls the motor 62 of the second rotating mechanism 60, rotates the supporting mechanism 40 on the b-axis_and inclines the supporting mechanism 40, and thereby sets the posture of the supporting mechanism 40. The control portion 84x moves the spindle 11 in the X-axis direction by controlling the motor 21 of the second moving mechanism 20, and sets the position of the spindle 11 in the X-axis direction. The control portion 84y moves the supporting mechanism 40 in the Y-axis direction by controlling the motor of the third moving mechanism 30, and sets the position of the supporting mechanism 40 in the Y-axis direction. The control portion 84z moves the spindle 11 in the Z-axis direction by controlling the motor 14 of the first moving mechanism 10, and sets the position of the spindle 11 in the Z-axis direction. With these operations, the position of the spindle 11 relative to the supporting mechanism 40 is set in the X axis, the Y axis, and the Z axis.

The control portion 84c controls the motor 13, which drives and rotates the spindle 11. The control portion 84c rotates the machining tool 12 attached to the spindle 11, at high speed. Thus, the size and weight of the control portion 84c tend to be larger than those of the other control portions 84a, 84b, 84x, 84y, and 84z. For this reason, in the present embodiment, the frame 81 of the electric unit 80 is provided with a partition portion 82 that partitions the installation space of the control portions in the vertical direction, and the large and heavy control portion 84c is disposed below the partition portion 82 and the small and light control portions 84a, 84b, 84x, 84y, and 84z are disposed above the partition portion 82. Since the heavy object is disposed in the lower portion, the apparatus can be stabilized. In addition, since the small control portions are collectively disposed above the partition portion 82, the space can be effectively used and the apparatus can be downsized.

In addition, the control board 83 is disposed on a side surface of the frame 81 for easy wiring. However, the components of the electric unit 80 may be arranged in any order.

Figure 8:
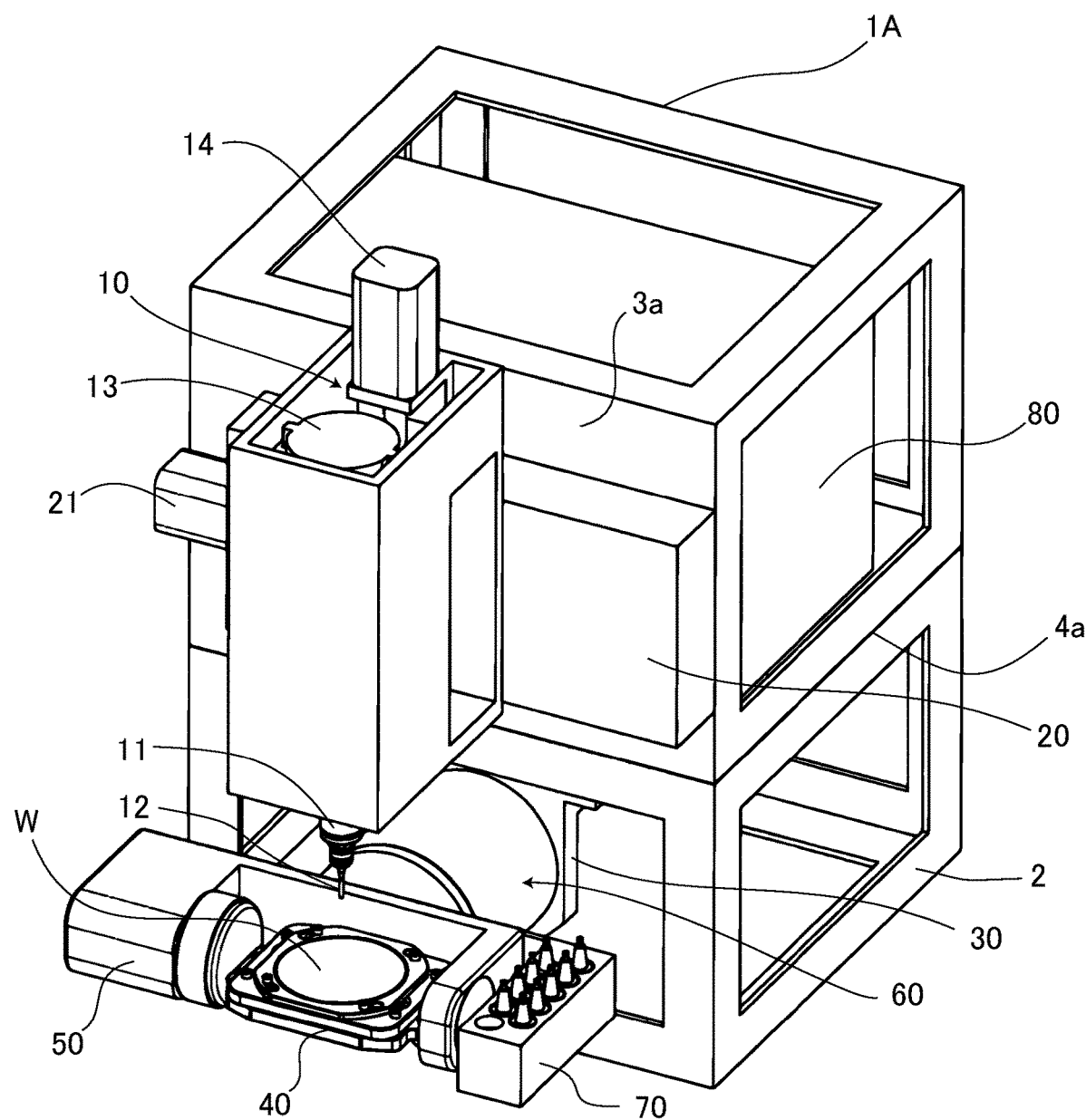
FIG. 8 is a perspective view of a machining apparatus of another first example of the first embodiment.

In the above description, the moving-mechanism supporting member that supports the moving mechanisms, the rotating mechanisms, and the electric unit is the L-shaped frame 1. However, the moving-mechanism supporting member may be a box-shaped frame 1A, as illustrated in FIG. 8. Similar to the frame 1, the frame 1A also includes the first surface 3a that supports the first moving mechanism 10 and the second moving mechanism 20, and the second surface 4a that supports the third moving mechanism 30. In addition, the electric unit 80 is disposed inside the box-shaped frame 1A.

When the workpiece W is machined by using the machining apparatus 100, a surface (top surface) to be machined of the workpiece W is cut by the machining tool 12, with the spindle 11 to which the machining tool 12 is attached being moved up and down, while rotated, by the first moving mechanism 10. When the workpiece W is machined, any portion of the surface of the workpiece W can be cut by the second moving mechanism 20 moving the spindle 11 in the X-axis direction, by the third moving mechanism 30 moving the supporting mechanism 40 that supports the workpiece W, in the Y-axis direction, and by the first moving mechanism 10 moving up and down the spindle 11. In addition, the workpiece W can be cut even in a state where the workpiece W is rotated on the b-axis by the second rotating mechanism 60 and inclined. Furthermore, the workpiece W can be cut in a state where the workpiece W is turned upside down by the first rotating mechanism 50.

The machining apparatus 100 of the present embodiment is a computer-controlled NC machining apparatus that automatically machines a workpiece. Specifically, machining data is created by using an external terminal, such as a personal computer, and a CAD/CAM system; and the machining apparatus 100 machines the workpiece W under the numerical control, depending on the machining data. For this reason, the machining apparatus 100 is connected with the external terminal, such as a personal computer, that instructs the machining apparatus 100. Note that the machining apparatus 100 itself may include a computer that includes a CPU and a memory, and that can perform the numerical control.

For example, when a dental prosthesis is formed by the machining apparatus 100, the data of the dental prosthesis measured by using a three-dimensional measuring instrument is sent to a CAD/CAM system, and the machining data is created by the CAD/CAM system. The machining apparatus 100 is controlled depending on the machining data, and thereby the workpiece W is cut by the machining tool 12. In the manner, the dental prosthesis is produced.

Thus, in the machining apparatus that machines a workpiece, it is preferable to ensure sufficient rigidity of the moving-mechanism supporting member that supports the moving mechanisms that moves the spindle and the workpiece, and the rotating mechanisms that rotate the workpiece. In particular, if a workpiece is cut in a state where the spindle is rotated at high speed, it is desired to ensure the sufficient rigidity of the moving-mechanism supporting member. For example, in the configuration described in Patent Literature 1, a workpiece is moved and rotated while supported by a side surface of a frame of the apparatus. In this configuration, it is difficult to ensure sufficient rigidity required for supporting the workpiece. If the rigidity of portions that support the workpiece and the spindle is insufficient, the machining stability may deteriorate.

In contrast, in the present embodiment, the frame 1 and the frame 1A that support the moving mechanisms and the rotating mechanisms each include the first surface 3a and the second surface 4a orthogonal to the first surface 3a. In addition, the first moving mechanism 10 and the second moving mechanism 20 are supported by the first surface 3a, and the third moving mechanism 30 is supported by the second surface 4a. Furthermore, the first rotating mechanism 50 and the second rotating mechanism 60 are supported by the second surface 4a via the third moving mechanism 30. In this manner, the moving mechanisms and the rotating mechanisms are supported by the frame 1 or 1A that has an L-shaped portion. This configuration has higher supporting rigidity than that of the configuration in which the moving mechanisms and the rotating mechanisms are supported by the side plate. Thus, the configuration of the present embodiment can ensure the machining stability for the workpiece and increase the machining accuracy for the workpiece. In addition, even when the present embodiment is applied to a machining apparatus including a spindle that rotates at high speed, sufficient rigidity can be ensured.

Supporting Mechanism

Next, a supporting mechanism 40A of the present embodiment that supports the workpiece W will be more specifically described with reference to FIGS. 9 to 13. The supporting mechanism 40A illustrated in FIGS. 9 to 13 differs from the above-described supporting mechanism 40 illustrated in FIGS. 1 to 8 in that the supporting mechanism 40A includes pressing portions 43a, 43b, and 43c. That is, the supporting mechanism 40A illustrated in FIGS. 9 to 13 also includes the holding portion 41 and the supporting portion 42. The holding portion 41 holds the workpiece W. The supporting portion 42 is linked with the rotary portions 51 and 52 of the first rotating mechanism 50, and supports the workpiece W via the holding portion 41. The holding portion 41 is pressed by the pressing portions 43a, 43b, and 43c, so that the holding portion 41 is fixed to the supporting portion 42.

Note that in the supporting mechanism 40 illustrated in FIGS. 1 to 8, the holding portion 41 may be fixed to the supporting portion 42 via fixing members such as screws, or may be fixed to the supporting portion 42 in a configuration of a later-described second embodiment. However, also in the supporting mechanism 40 illustrated in FIGS. 1 to 8, the relationship between the center of the workpiece W (held by the holding portion 41) located in the thickness direction of the workpiece W and the position at which the supporting portion 42 is linked with the rotary portions 51 and 52 is the same as that described below.

Figure 9:
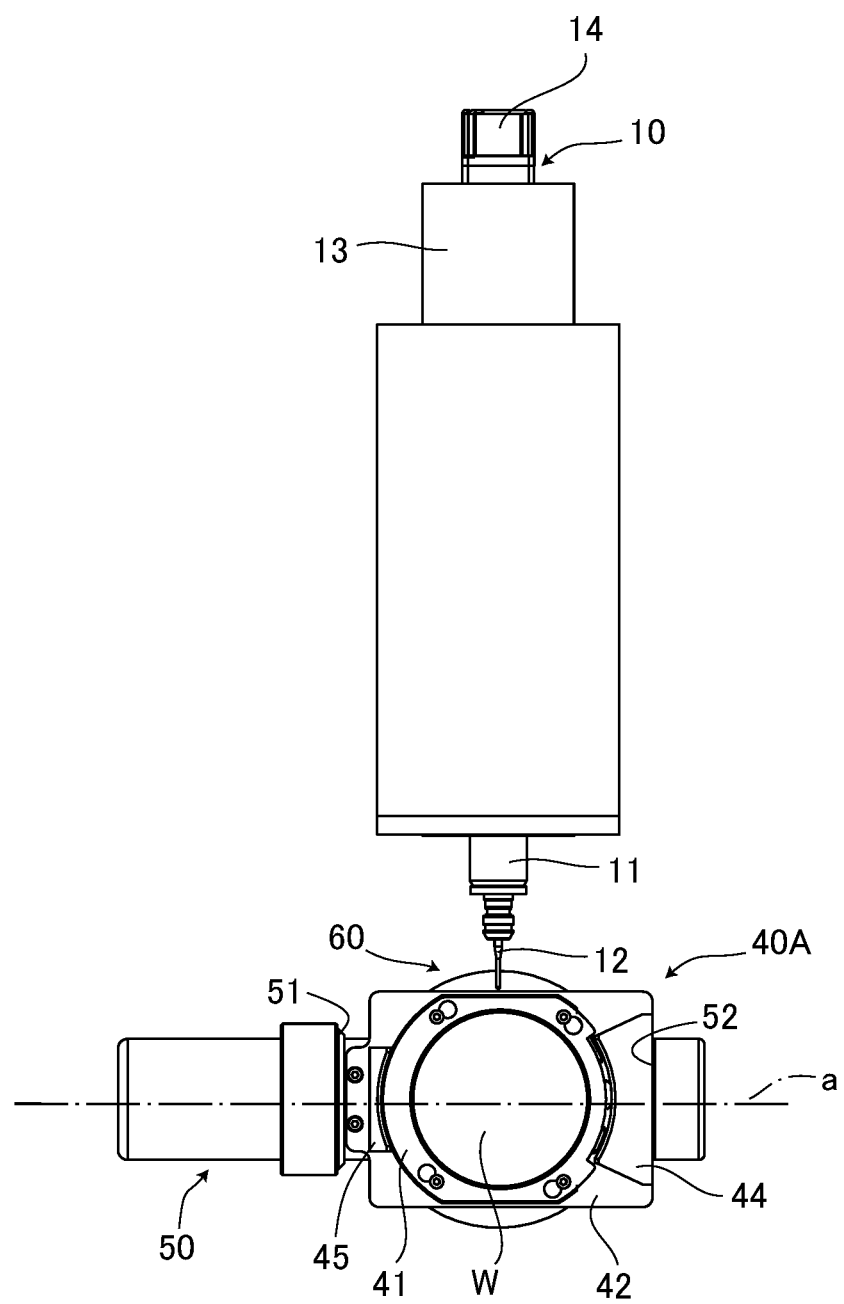
FIG. 9 is a front view illustrating one portion of a machining apparatus of another second example of the first embodiment.
Figure 10:
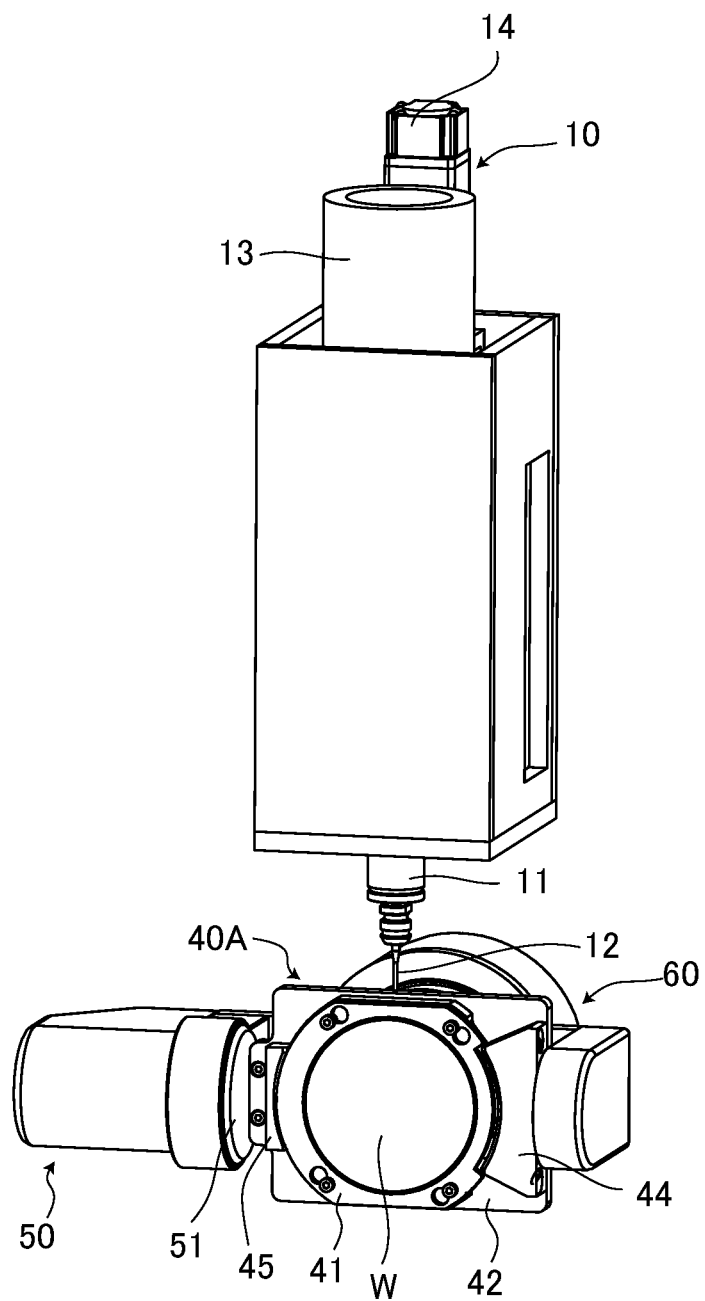
FIG. 10 is a perspective view illustrating one portion of the machining apparatus of the other second example of the first embodiment.

As illustrated in FIGS. 9 and 10, the supporting mechanism 40A includes a pressing apparatus 44 and a receiving apparatus 45, which are disposed so as to nip the holding portion 41 that holds the workpiece W. The pressing apparatus 44 and the receiving apparatus 45 are disposed on the a-axis. In addition, the pressing apparatus 44 is disposed on the rotary portion 52 side of the first rotating mechanism 50, and the receiving apparatus 45 is disposed on the rotary portion 51 side. As illustrated in FIG. 13 described later, the pressing apparatus 44 includes the pressing portions 43a, 43b, and 43c, which press the holding portion 41 toward the receiving apparatus 45 and the supporting portion 42. The receiving apparatus 45 is in contact with the holding portion 41, and receives the pressing force applied to the holding portion 41 by the pressing apparatus 44. In addition, the pressing apparatus 44 and the receiving apparatus 45 are fixed on the supporting portion 42.

Figure 11:
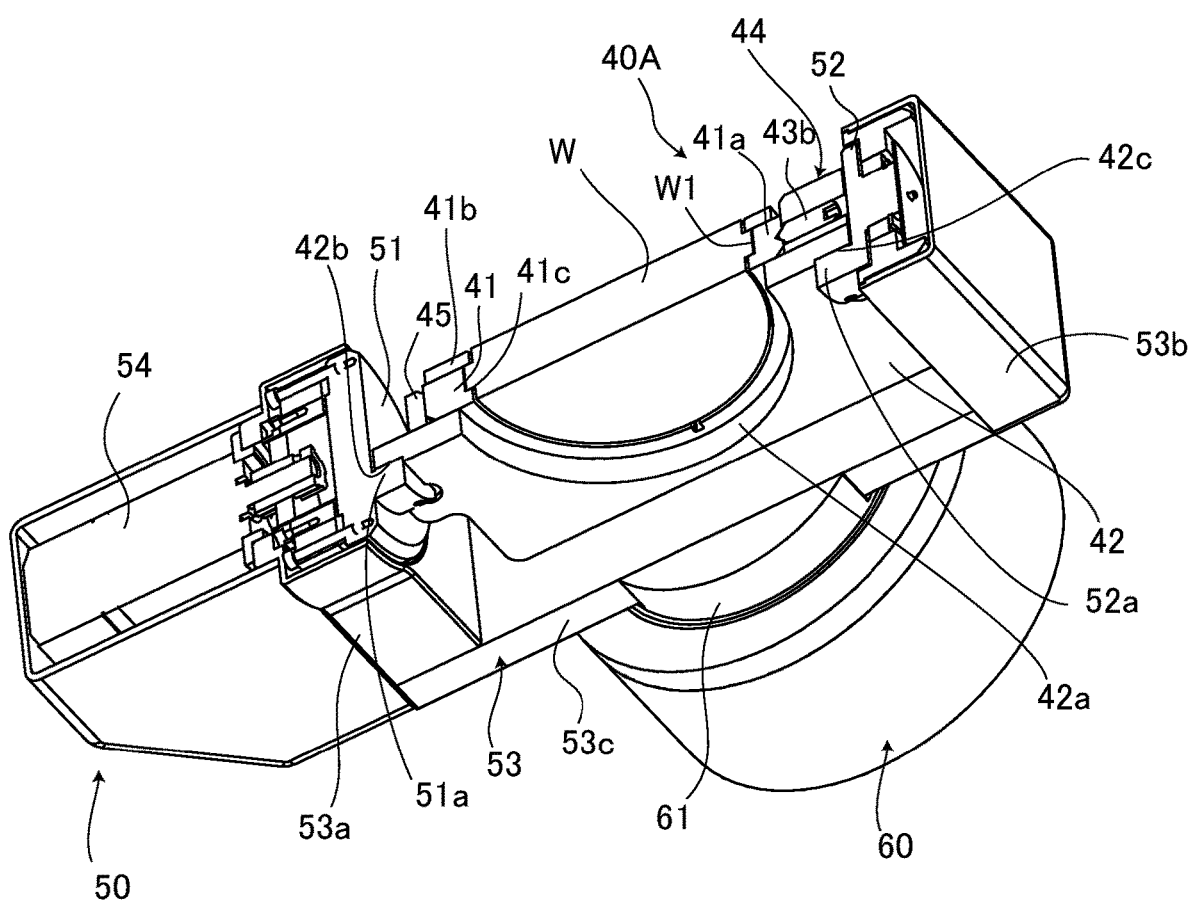
FIG. 11 is a cross-sectional view of a supporting mechanism and a first rotating mechanism of the other second example of the first embodiment.

FIG. 11 is a perspective view illustrating a cross section of the first rotating mechanism 50 and the supporting mechanism 40A, taken along the a-axis. FIG. 11 illustrates the supporting mechanism 40A viewed from the supporting portion 42 side. As illustrated in FIG. 11, the workpiece W is a disk-like member, and has a projection portion W1 formed on the whole of the outer circumferential portion of the workpiece W. The holding portion 41 includes a body portion 41a and a holding-plate portion 41b. The body portion 41a has a concave portion 41c into which the projection portion W1 of the workpiece W can be inserted. The workpiece W is held by the holding portion 41 such that the projection portion W1 is nipped by the concave portion 41c of the body portion 41a and the holding-plate portion 41b. For example, the holding-plate portion 41b is fixed to the body portion 41a via screws 41d (see FIG. 12 for example) in a state where the workpiece W is nipped by the holding-plate portion 41b and the body portion 41a.

The supporting portion 42 has a through-hole 42a that is larger than the outer diameter of the workpiece W and smaller than the outer diameter of the circumcircle of the holding portion 41. Thus, when the workpiece W is inverted by the first rotating mechanism 50 for machining the back surface of the workpiece W, the machining tool 12 can contact the workpiece W through the through-hole 42a. That is, the machining tool 12 can cut the back surface of the workpiece W through the through-hole 42a. In addition, the holding portion 41 can be placed on the outer periphery of the through-hole 42a of the supporting portion 42.

Figure 12:
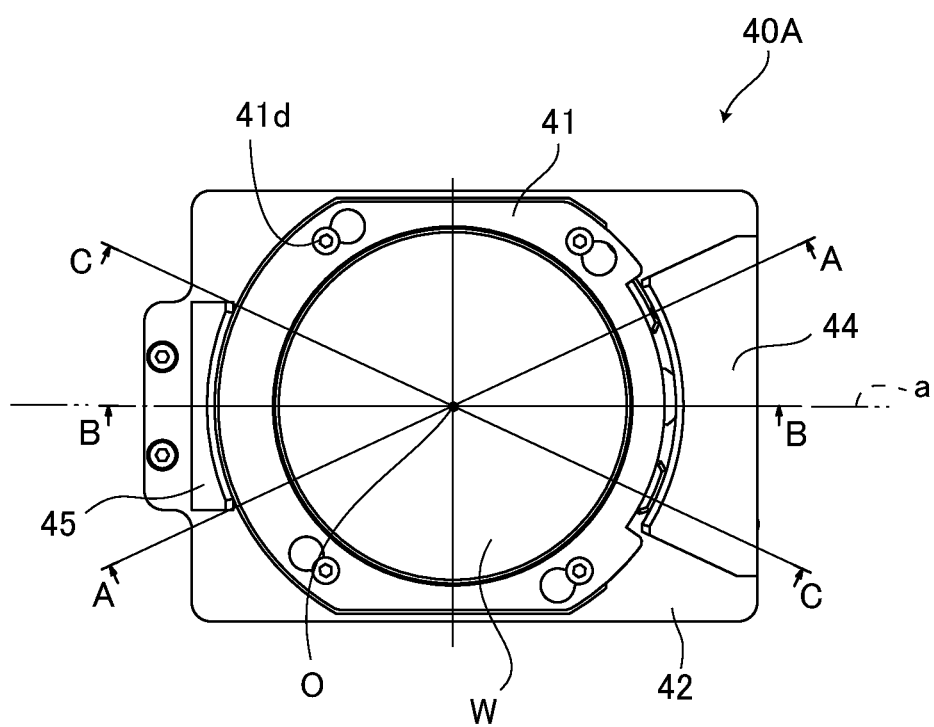
FIG. 12 is a plan view of the supporting mechanism of the other second example of the first embodiment.
Figure 13A:
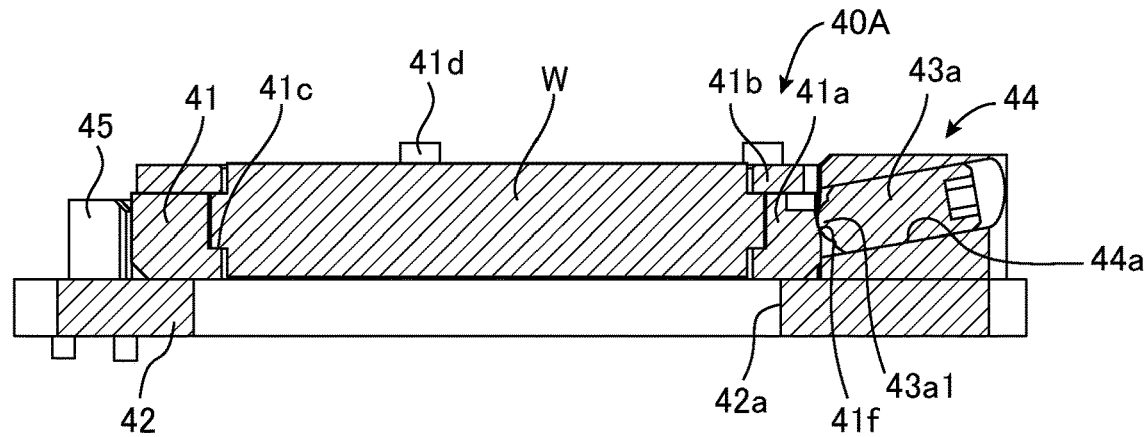
FIG. 13A is a cross-sectional view taken along a line A-A of FIG. 12.
Figure 13B:
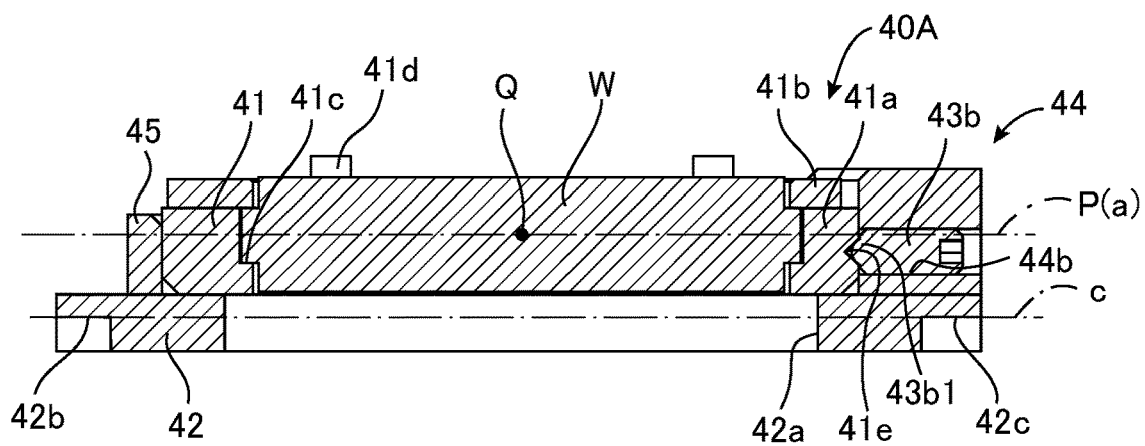
FIG. 13B is a cross-sectional view taken along a line B-B of FIG. 12.
Figure 13C:
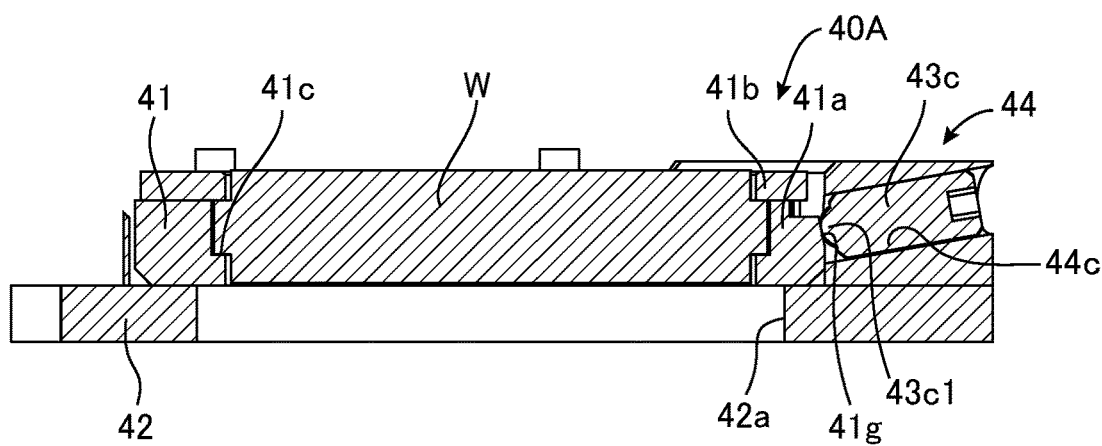
FIG. 13C is a cross-sectional view taken along a line C-C of FIG. 12.

FIG. 12 is a plan view of the supporting mechanism 40A, viewed from the holding portion 41 side. FIG. 13B is a cross-sectional view taken along a line B-B of FIG. 12, which passes through the a-axis. FIG. 13A is a cross-sectional view taken along a line A-A, which is obtained by rotating the a-axis counterclockwise by a predetermined angle on a center O of the workpiece W. FIG. 13C is a cross-sectional view taken along a line C-C, which is obtained by rotating the a-axis clockwise by a predetermined angle on the center O of the workpiece W. The rotation angle of the A-A line with respect to the a-axis is the same as the rotation angle of the C-C line with respect to the a-axis. The center O of the workpiece W is the center of the disk-like workpiece W in the plan view.

As illustrated in FIG. 13B, a plane extending along the a-axis, which is a rotation axis of the first rotating mechanism 50, is denoted by P. Thus, the thickness direction of the workpiece W is orthogonal to the plane P. In addition, a center of the workpiece W in the thickness direction of the workpiece W is denoted by Q. In this case, the holding portion 41 holds the workpiece W at a position which the plane P passes through. In addition, the holding portion 41 holds the workpiece W such that the extension line of the a-axis passes through the center Q of the workpiece W, which is a center in the thickness direction of the workpiece W.

On the other hand, the supporting portion 42 that supports the holding portion 41 is linked with the first rotating mechanism 50 at a linking position c. The linking position c is located, in the thickness direction of the workpiece W, on one side (lower side in FIG. 13B) of the position at which the workpiece W is held by the holding portion 41; and is shifted from the a-axis. Thus, at both edge portions of the supporting portion 42 in the a-axis direction, linking portions 42b and 42c are formed. As illustrated in FIG. 11, the linking portions 42b and 42c are respectively linked with linking projection portions 51a and 52a of the rotary portions 51 and 52.

The linking projection portion 51a of the rotary portion 51 projects from a position shifted from the a-axis, along the a-axis. The linking projection portion 52a of the rotary portion 52 projects from a position shifted from the a-axis, along the a-axis. On the other hand, the linking portions 42b and 42c formed in the supporting portion 42 have cutouts, into which the linking projection portions 51a and 52a can be inserted. Thus, the linking portions 42b and 42c and the linking projection portions 51a and 52a are fixed to each other in a state where the linking projection portions 51a and 52a are inserted into the linking portions 42b and 42c. The amount of shift of the linking projection portion 51a from the a-axis is the same as that of the linking projection portion 52a from the a-axis, and the size of the cutout of the linking portion 42b is the same as that of the linking portion 42c. Thus, as illustrated in FIG. 13B, the linking projection portions 51a and 52a are linked with the linking portions 42b and 42c at the linking position c, which is shifted from the a-axis.

In the present embodiment, the workpiece W is held by the holding portion 41 such that the a-axis passes through the center Q of the workpiece W located in the thickness direction of the workpiece W. Thus, even though the linking position c at which the supporting portion 42 is linked with the rotary portions 51 and 52 is shifted from the a-axis, the workpiece W and the supporting mechanism 40A can be rotated on the a-axis by the rotary portions 51 and 52 that rotate on the a-axis.

As illustrated in FIGS. 13A to 13C, the pressing apparatus 44 includes the pressing portions 43a, 43b, and 43c disposed at a plurality of positions (three positions in the present embodiment) around the holding portion 41. The pressing portions 43a, 43b, and 43c press one portion of the circumferential portion of the holding portion 41. The one portion of the circumferential portion is a portion through which the plane P passes. Specifically, as illustrated in FIG. 13B, the pressing portion 43b disposed at a position through which the a-axis passes presses the holding portion 41 in a direction that is substantially parallel with the a-axis. The pressing portion 43b is urged by a spring (not illustrated), and thereby presses the holding portion 41 toward the receiving apparatus 45. Thus, the pressing apparatus 44 has a guide hole 44b that guides the pressing portion 43b so that the pressing portion 43b can move along the direction, which is substantially parallel with the a-axis direction.

The pressing portion 43b has a projection portion 43b1 formed at a leading end of the pressing portion 43b. The projection portion 43b1 engages with a concave portion 41e formed in the outer circumferential surface of the holding portion 41, so that the holding portion 41 is positioned in a direction of rotation whose center is an axis orthogonal to the plane P. Note that the projection portion 43b1 may be a ball disposed at the leading end of the pressing portion 43b so as to be able to rotate, or may have a hemispherical shape formed by rounding the leading end of the pressing portion 43b.

When the holding portion 41 is attached to the supporting portion 43, the holding portion 41 is inserted into a space between the pressing apparatus 44 and the receiving apparatus 45 disposed on the supporting portion 42. Specifically, the holding portion 41 is inserted into the space such that the concave portion 41e of the holding portion 41 and the projection portion 43b1 of the pressing portion 43b are out of phase with each other in the rotational direction. Then the holding portion 41 is rotated relative to the supporting portion 42, so that the concave portion 41e and the projection portion 43b1 are in phase and engaged with each other. With this operation, the holding portion 41 is positioned with respect to the supporting portion 42 in the rotational direction.

On the other hand, the pressing portions 43a and 43c disposed on both sides of the pressing portion 43b in the rotational direction press the holding portion 41 in a direction inclined with respect to the plane P, as illustrated in FIGS. 13A and 13C. The pressing portions 43a and 43c are urged by springs (not illustrated), and thereby press the holding portion 41 toward the supporting portion 42. Note that the pressing direction of the pressing portions 43a and 43c is inclined with respect to the plane P so that the pressing direction extends toward one side (supporting portion 42 side) of the direction extending along the plane P. That is, part of components of the force applied by the pressing portions 43a and 43c in the pressing direction is applied in a direction in which the holding portion 41 is pressed against the supporting portion 42. Thus, the pressing apparatus 44 has guide holes 44a and 44c that guide the pressing portions 43a and 43c so that the pressing portions 43a and 43c can move along the direction, which is inclined with respect to the plane P.

The pressing portions 43a and 43c also have projection portions 43a1 and 43c1 formed at leading ends of the pressing portions 43a and 43c. On the other hand, the holding portion 41 has sloped surfaces 41f and 41g, which engage with the projection portions 43a1 and 43c1. The sloped surfaces 41f and 41g are substantially orthogonal to the pressing direction of the pressing portions 43a and 43c. Thus, the holding portion 41 is effectively pressed toward the supporting portion 42 by the pressing force of the pressing portions 43a and 43c. Note that the projection portions 43a1 and 43c1 may be balls disposed at the leading ends of the pressing portions 43a1 and 43c1 so as to be able to rotate, or may have a hemispherical shape formed by rounding the leading ends of the pressing portions 43a and 43c. In addition, the pressing portions 43a, 43b, and 43c may be the same components as each other.

Thus, since the holding portion 41 is pressed toward the supporting portion 42 by the pressing portions 43a and 43c, the holding portion 41 is fixed to the supporting portion 42. In addition, the holding portion 41 is positioned with respect to the supporting portion 42 in the rotational direction, by the pressing portion 43b.

As described above, in the present embodiment, the supporting portion 42 that supports the holding portion 41 is linked with the first rotating mechanism 50 at the linking position c. The linking position c is located, in the thickness direction of the workpiece W, on one side (lower side in FIG. 13B) of the position at which the workpiece W is held by the holding portion 41; and is shifted from the a-axis. Thus, when the workpiece W is machined, sufficient rigidity is easily ensured for the machining load applied to the workpiece W. That is, in the present embodiment, since the holding position of the workpiece W and the linking position between the supporting mechanism 40A and the first rotating mechanism 50 are shifted from each other, sufficient rigidity can be ensured for the machining load applied to the workpiece W.

Patent Literature 1 describes a configuration that includes a holding portion and a rotating mechanism. The holding portion nips and holds an object to be machined, and the rotating mechanism rotates the object via the holding portion. In the configuration described in Patent Literature 1, it is considered that the position at which the holding portion holds the object, the position at which the rotating mechanism supports the object via the holding portion, and the center of rotation of the object are on an identical axis. If the position at which the holding portion holds the object, and the position at which the rotating mechanism supports the object are substantially on an identical axis, it is difficult to ensure sufficient rigidity in the configuration for supporting the object, for the load to the object applied when the object is machined. Thus, the sufficient machining accuracy for the object to be machined may not be ensured.

Hereinafter, the description thereof will be specifically made. When the workpiece W is machined, force is transmitted from the workpiece W to the supporting portion 42 through the holding portion 41. The force is applied to the linking portion between the supporting portion 42 and the first rotating mechanism 50. If the position at which the holding portion 41 holds the workpiece W, and the position at which the first rotating mechanism 50 supports the workpiece W, that is, the linking portion between the supporting portion 42 and the rotary portions 51 and 52 are on an identical straight line, a portion that includes the linking portion and the workpiece W can be regarded as a straight beam. Thus, if a machining load is applied to the workpiece W, the straight beam bends easily, probably deteriorating the machining accuracy.

In contrast, in the present embodiment, the position at which the holding portion 41 holds the workpiece W and the linking position c between the supporting portion 42 and the first rotating mechanism 50 are shifted from each other. Thus, a portion that extends from the linking position through the supporting portion 42 and the holding portion 41 to the workpiece W can be regarded as a crank-shaped member formed as one body. Thus, the strength against the bending caused when the machining load is applied to the workpiece W can be increased. As a result, sufficient rigidity can be ensured for the load to the workpiece W applied when the workpiece W is machined, and the sufficient machining accuracy for the workpiece W is easily ensured.

The a-axis that serves as a rotation axis of the first rotating mechanism 50 passes through the center Q located in the thickness direction of the workpiece W, and the linking position c between the supporting portion 42 and the first rotating mechanism 50 is shifted from the a-axis. Thus, even when the workpiece W is turned upside down by rotating the workpiece W on the a-axis, the positional relationship between the center Q of the workpiece W located in the thickness direction of the workpiece W and the machining tool 12 is unchanged. Thus, the workpiece W can be machined without correcting the positional relationship between the machining tool 12 and the workpiece W, which is produced by inverting the workpiece W. That is, in the present embodiment, in the configuration in which the workpiece W can be machined in a state where the workpiece W is inverted, the machining performance can be prevented from deteriorating when the workpiece W is inverted, and sufficient rigidity can be ensured for the machining load applied when the front surface of the workpiece W is machined.

In addition, in the present embodiment, the supporting portion 42 is disposed on one side of the holding portion 41, and the holding portion 41 is supported by the supporting portion 42. Thus, when the front surface (top surface in FIGS. 13A, 13B, and 13C) of the workpiece W is machined, the load applied to the workpiece W can be sufficiently supported by the supporting portion 42. On the other hand, for the load to the back surface of the workpiece W applied when the back surface of the workpiece W is machined, sufficient supporting strength is ensured in the configuration as described below.

That is, in the present embodiment, as described above, since the holding portion 41 is pressed against the supporting portion 42 by the holding portion 41 being pressed by the pressing portions 43a and 43c, sufficient strength can be ensured against the force applied toward a direction in which the holding portion 41 is separated from the supporting portion 42. Thus, even when the supporting mechanism 40A is inverted and the back surface of the workpiece W is machined on the supporting portion 42 side, the load transmitted to the holding portion 41 through the workpiece W can be sufficiently supported by the pressing portions 43a and 43c. That is, when the back surface of the workpiece W is machined, the force is applied to the holding portion 41 via the workpiece W in a direction in which the holding portion 41 is separated from the supporting portion 42. However, since the holding portion 41 is pressed against the supporting portion 42 by the pressing force of the pressing portions 43a and 43c, sufficient holding strength for the workpiece W can be ensured against the load applied when the workpiece W is machined. As a result, the back surface of the workpiece W can be stably machined, and the sufficient machining accuracy for the workpiece W can be ensured.

Tool Magazine

Figure 14:
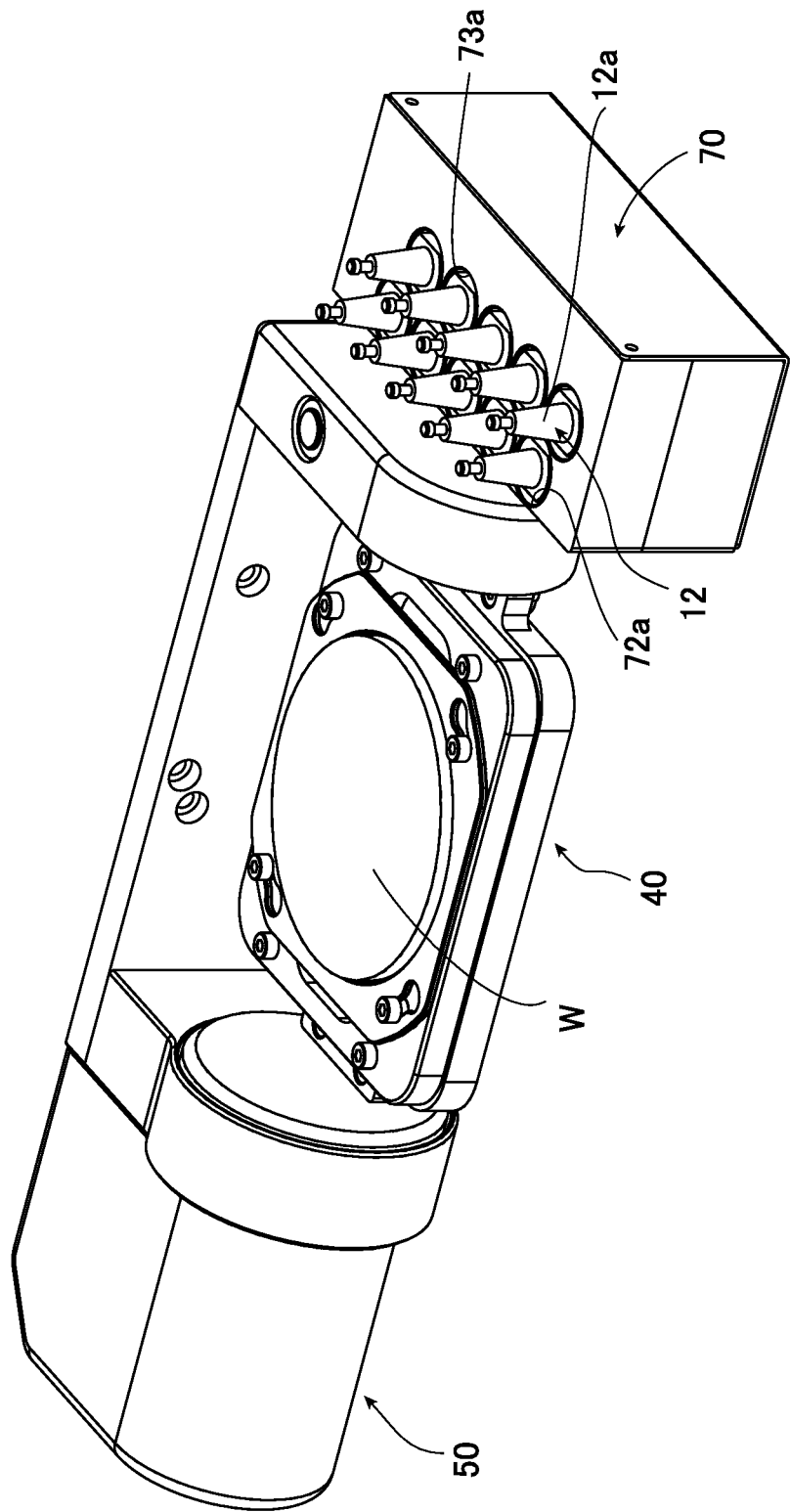
FIG. 14 is a perspective view of the first rotating mechanism, the supporting mechanism, and a tool magazine of the first embodiment.
Figure 15:
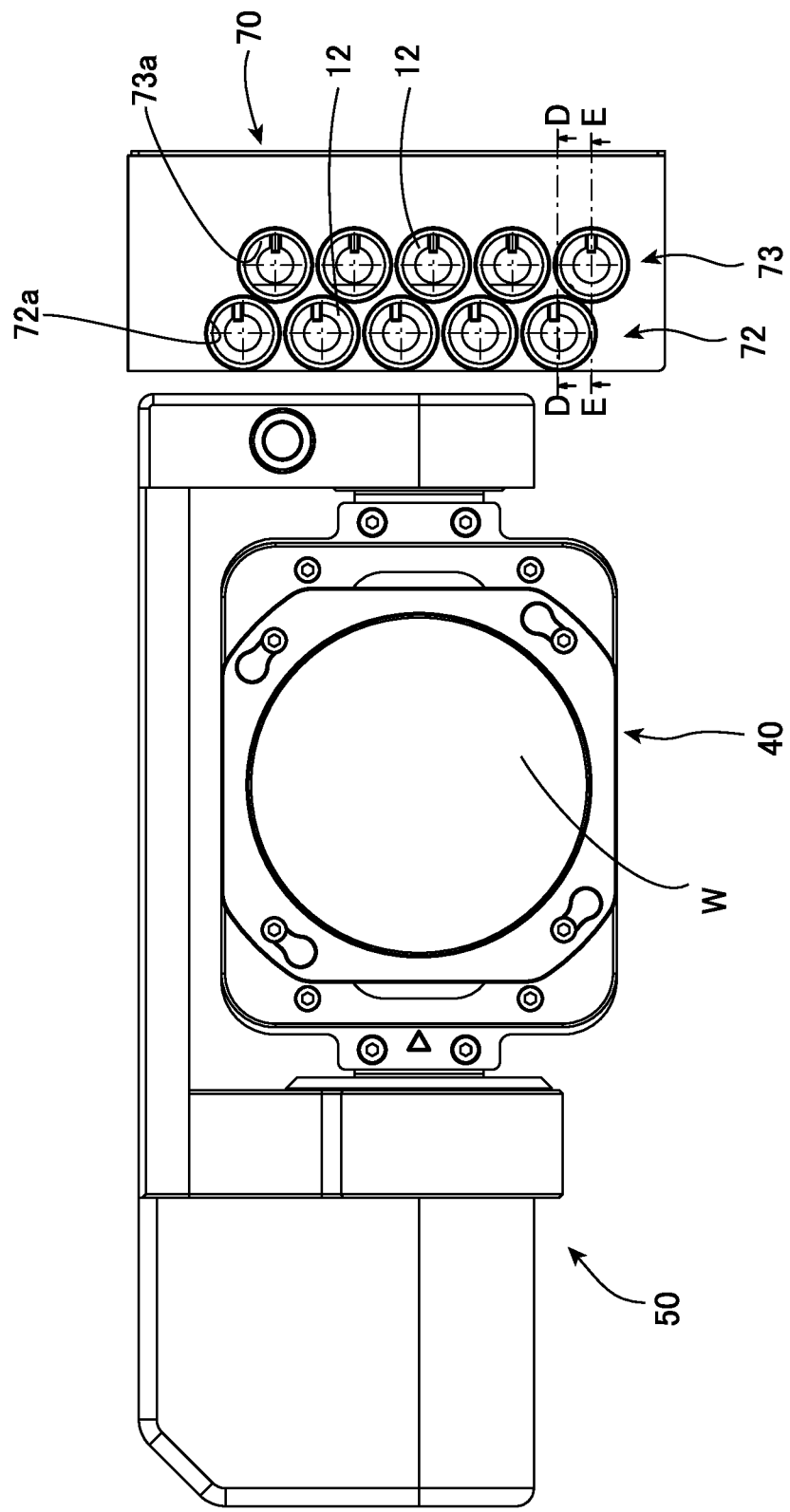
FIG. 15 is a plan view of the first rotating mechanism, the supporting mechanism, and the tool magazine of the first embodiment.

Next, the tool magazine 70 of the present embodiment that serves as a tool holding portion will be described with reference to FIGS. 14 to 16. As described above, the tool magazine 70 can hold a plurality of machining tools. In addition, the tool magazine 70 is disposed adjacent to the first rotating mechanism 50, and is supported by the supporting member 71, as illustrated in FIG. 2. In the tool magazine 70, a plurality of machining tools 12 can be disposed in each of a plurality of lines (two lines in the present embodiment). Each machining tool 12 is integrated with a corresponding tool holder 12a.

Hereinafter, the description thereof will be specifically made. As illustrated in FIGS. 14 and 15, the tool magazine 70 includes a plurality of first tool-arrangement portions 72a and a plurality of second tool-arrangement portions 73a. Each of the first tool-arrangement portions 72a and the second tool-arrangement portions 73a are formed so that a plurality of machining tools 12 can be detachably attached to the tool magazine 70 in a predetermined direction (Z-axis direction in the present embodiment). In the plurality of first tool-arrangement portions 72a, a plurality of machining tools 12 can be disposed along a first line 72. In the plurality of second tool-arrangement portions 73a, a plurality of machining tools 12 can be disposed along a second line 73 that is adjacent to and substantially parallel with the first line 72. In the present embodiment, the first line 72 and the second line 73 extend along the Y-axis direction, and are adjacent to each other in the X-axis direction. However, the first line 72 and the second line 73 may extend in the X-axis direction, and may be adjacent to each other in the Y-axis direction.

In particular, in the present embodiment, the plurality of first tool-arrangement portions 72a and the plurality of second tool-arrangement portions 73a are formed such that the plurality of machining tools 12 are disposed in such a manner that the center of a machining tool 12 disposed in the first line 72 is shifted from the center of a machining tool 12 disposed in the second line 73 in a direction extending along the first line 72 and the second line 73. In other words, the plurality of first tool-arrangement portions 72a and the plurality of second tool-arrangement portions 73a are disposed, shifted from each other in the direction (Y-axis direction) extending along the first line 72 and the second line 73. Specifically, the first tool-arrangement portions 72a and the second tool-arrangement portions 73a are disposed such that a portion of a single second tool-arrangement portion 73a is inserted into a space between elements of an adjacent pair of the first tool-arrangement portions 72a, or that a portion of a single first tool-arrangement portion 72a is inserted into a space between elements of an adjacent pair of the second tool-arrangement portions 73a. More specifically, the plurality of first tool-arrangement portions 72a and the plurality of second tool-arrangement portions 73a are disposed in a staggered manner.

Since the plurality of first tool-arrangement portions 72a and the plurality of second tool-arrangement portions 73a are disposed in such a staggered manner, the plurality of first tool-arrangement portions 72a and the second tool-arrangement portions 73a can be disposed closer to each other. Thus, the tool magazine 70 can be downsized in the X-axis direction. Note that in the present embodiment, the first line 72 is disposed on the first rotating mechanism 50 side, and the second line 73 is disposed on a side located away from the first rotating mechanism 50.

Figure 16A:
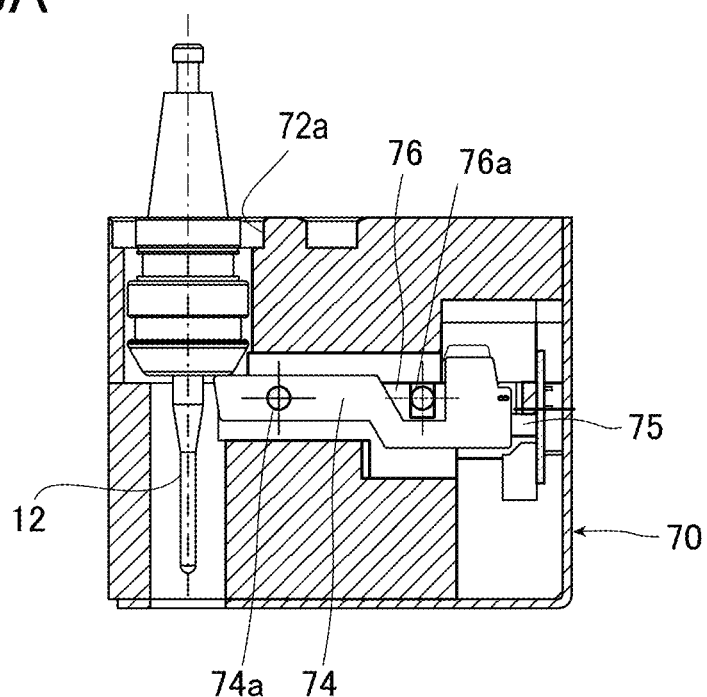
FIG. 16A is a cross-sectional view taken along a line D-D of FIG. 15.

In addition, in the present embodiment, attachment/detachment of the machining tools 12 to/from the plurality of first tool-arrangement portions 72a and the plurality of second tool-arrangement portions 73a can be detected. The description thereof will be described with reference to FIGS. 16A and 16B. FIG. 16A illustrates a configuration for detecting the attachment/detachment of a machining tool 12 to/from a corresponding first tool-arrangement portion 72a disposed in the first line 72.

In the present embodiment, for detecting the attachment/detachment of the machining tools 12 to/from the first tool-arrangement portions 72a, a plurality of first arm portions 74 and first detection portions 75 are provided. The first arm portions serve as first swing portions. The first arm portion 74 can swing on a swing axis 74a. In the present embodiment, the first detection portion 75 is a photo-interrupter including a light emitting portion and a light receiving portion, and the base end portion of the first arm portion 74 can pass through a space between the light emitting portion and the light receiving portion.

The plurality of first arm portions 74 are disposed so as to extend from a side of the second line 73 opposite to the first line 72, through the space in which the second tool-arrangement portions 73a are not disposed in the direction extending along the second line 73. Each of the plurality of first arm portions 74 swings in accordance with the attachment-and-detachment operation of a corresponding machining tool 12 performed on a corresponding first tool-arrangement portion 72a. The first detection portions 75 are disposed on a side of the second line 73 opposite to the first line 72, and detect the attachment and detachment of the machining tools 12 performed on the first tool-arrangement portions 72a, by detecting the swing operation of the first arm portions 74.

The leading end portion of the first arm portion 74 can engage with one portion of the machining tool 12 attached to the first tool-arrangement portion 72a. When the machining tool 12 is attached to the first tool-arrangement portion 72a, the first arm portion 74 swings to a position illustrated in FIG. 16A, and the base end portion is located between the light emitting portion and the light receiving portion of the first detection portion 75 and interrupts the light from the light emitting portion. On the other hand, when the machining tool 12 is removed from the first tool-arrangement portion 72a, the first arm portion 74 swings on the swing axis 74a such that the leading end portion moves up, and the base end portion moves out of the space between the light emitting portion and the light receiving portion of the first detection portion 75, allowing the light receiving portion to receive the light from the light emitting portion. The control board 83 (FIG. 7) determines the attachment/detachment of the machining tool 12 to/from the first tool-arrangement portion 72a, from a detection result by the first detection portion 75.

Figure 16B:
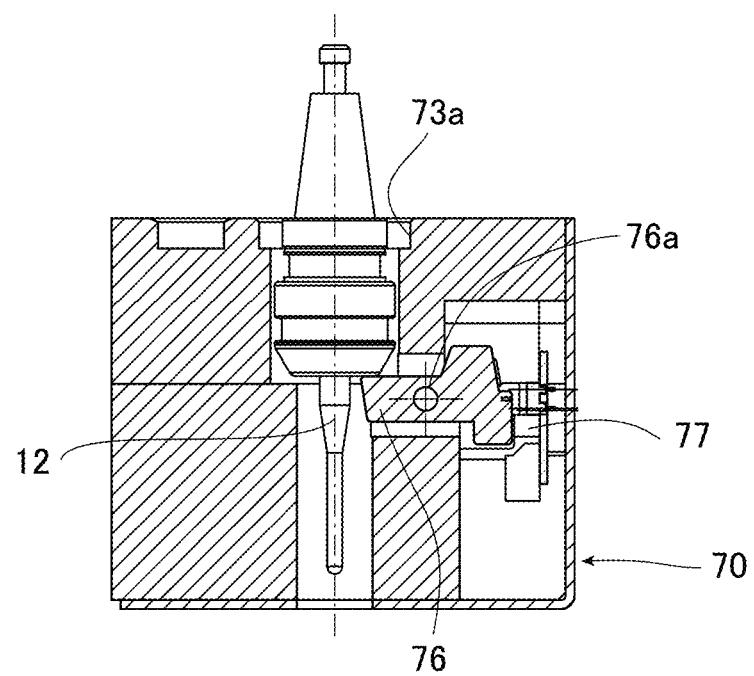
FIG. 16B is a cross-sectional view taken along a line E-E of FIG. 15.

FIG. 16B illustrates a configuration for detecting the attachment/detachment of a machining tool 12 to/from a corresponding second tool-arrangement portion 73a disposed in the second line 73. In the present embodiment, for detecting the attachment/detachment of the machining tools 12 to/from the second tool-arrangement portions 73a, a plurality of second arm portions 76 and second detection portions 77 are provided. The second arm portions serve as second swing portions. The second arm portion 76 is shorter than the first arm portion 74, and can swing on a swing axis 76a. The second detection portion 77 is a photo-interrupter, and is the same as the first detection portion 75. The base end portion of the second arm portion 76 can pass through a space between the light emitting portion and the light receiving portion.

The plurality of second arm portions 76 are disposed so as to extend from a side of the second line 73 opposite to the first line 72, toward the second tool-arrangement portions 73a. Each of the plurality of second arm portions 76 swings in accordance with the attachment-and-detachment operation of a corresponding machining tool 12 performed on a corresponding second tool-arrangement portion 73a. The second detection portions 77 are disposed on a side of the second line 73 opposite to the first line 72, and detect the attachment and detachment of the machining tools 12 performed on the second tool-arrangement portions 73a, by detecting the swing operation of the second arm portions 76.

The leading end portion of the second arm portion 76 can engage with one portion of the machining tool 12 attached to the second tool-arrangement portion 73a. When the machining tool 12 is attached to the second tool-arrangement portion 73a, the second arm portion 76 swings to a position illustrated in FIG. 16B, and the base end portion is located between the light emitting portion and the light receiving portion of the second detection portion 77 and interrupts the light from the light emitting portion. On the other hand, when the machining tool 12 is removed from the second tool-arrangement portion 73a, the second arm portion 76 swings on the swing axis 76a such that the leading end portion moves up, and the base end portion moves out of the space between the light emitting portion and the light receiving portion of the second detection portion 77, allowing the light receiving portion to receive the light from the light emitting portion. The control board 83 (FIG. 7) determines the attachment/detachment of the machining tool 12 to/from the second tool-arrangement portion 73a, from a detection result by the second detection portion 77.

In the present embodiment, the first detection portions 75 are disposed corresponding to the first arm portions 74, and equal in number to the first arm portions 74. Similarly, the second detection portions 77 are disposed corresponding to the second arm portions 76, and equal in number to the second arm portions 76. In addition, the first detection portions 75 and the second detection portions 77 are disposed on a side of the second line 73 opposite to the first line 72, in a single line and substantially parallel with the second line 73. However, the first detection portions 75 and the second detection portions 77 may not be disposed in a single line. For example, the first detection portions 75 and the second detection portions 77 may be disposed in a staggered manner.

Thus, in the present embodiment, the plurality of first tool-arrangement portions 72a and the plurality of second tool-arrangement portions 73a are disposed in a staggered manner, and the first arm portions 74 to detect the attachment/detachment of the machining tools 12 to/from the plurality of first tool-arrangement portions 72a are disposed so as to extend through between the plurality of second tool-arrangement portions 73a. As a result, the first detection portions 75 and the second detection portions 77 can be collectively disposed on one side of the first line 72 and the second line 73, so that the wiring for the first detection portions 75 and the second detection portions 77 can be easily performed. In addition, since the first detection portions 75 and the second detection portions 77 can be disposed in one line, the apparatus can be downsized.

Second Embodiment

A second embodiment will be described with reference to FIGS. 17 to 22. In the above-described first embodiment, the description has been made for the case where the holding portion 41 is fixed to the supporting portion 42 by the pressing portions 43a, 43b, and 43c. In the present embodiment, however, a holding portion 41A can be easily attached to and detached from a supporting portion 42A by rotating the holding portion 41A relative to the supporting portion 42A. In addition, in the present embodiment, a workpiece 201 having a plurality of blocks 200 is used as an object to be machined. The workpiece 201 may be used in the first embodiment, and the workpiece W of the first embodiment may be used in the present embodiment. Since the other configuration and operations are the same as those of the above-described first embodiment, an identical component is given an identical symbol, the illustration and the description thereof will be omitted or simplified, and features different from those of the first embodiment will be mainly described below.

First, the workpiece 201 will be described with reference to FIGS. 17A and 17B. In the dental field, a machining apparatus that cuts a single crown block into a dental prosthesis is provided. The machining apparatus can continuously cut a plurality of crown blocks (each of which is a single crown block) fixed on a dedicated jig. The workpiece 201 includes a jig 202 and a plurality of crown blocks 200 fixed on the jig 202. The workpiece 201 that includes the jig 202 is formed like a disk, and the shape of the outer circumference of the workpiece 201 is the same as that of the workpiece W of the first embodiment. In addition, it is preferable that the workpiece 201 including the plurality of blocks 200 can be easily attached to and detached from the apparatus for attaching/detaching the blocks 200 to/from the jig 202. For this reason, in the present embodiment, the holding portion 41A that holds the workpiece 201 can be easily attached to and detached from the supporting portion 42A.

Figure 17A:
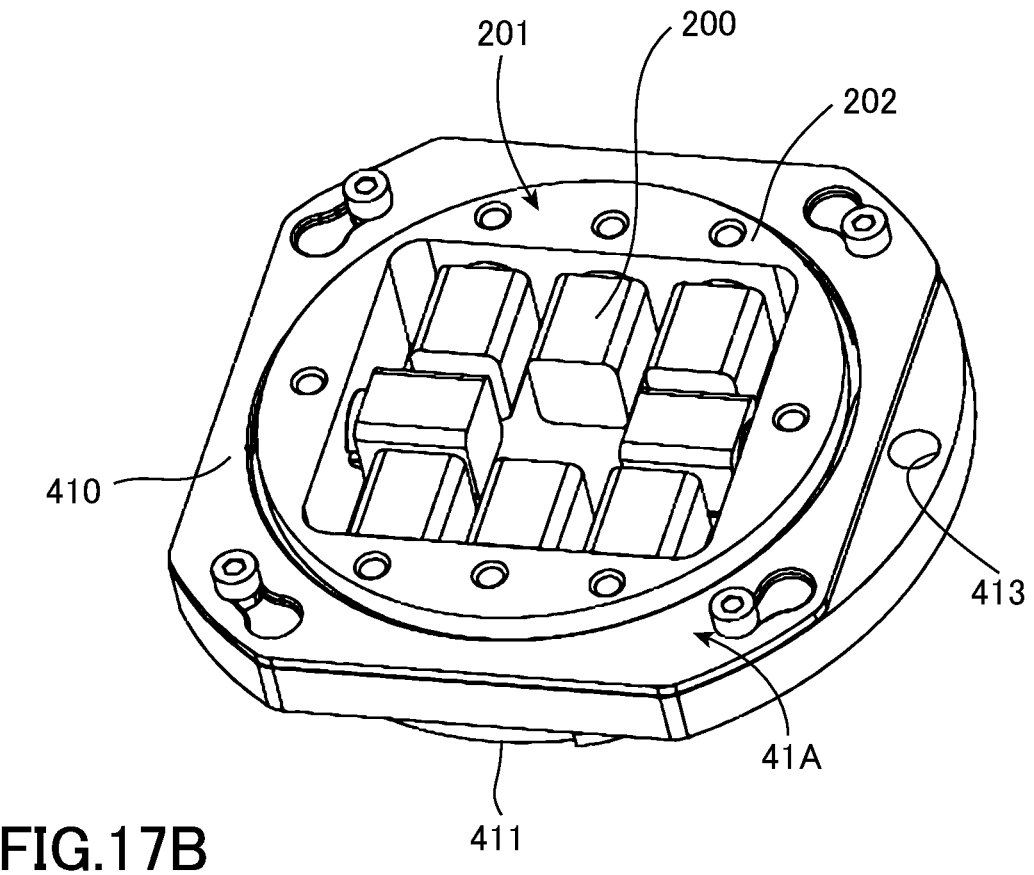
FIG. 17A is a perspective view of a holding portion of a second embodiment.
Figure 17B:
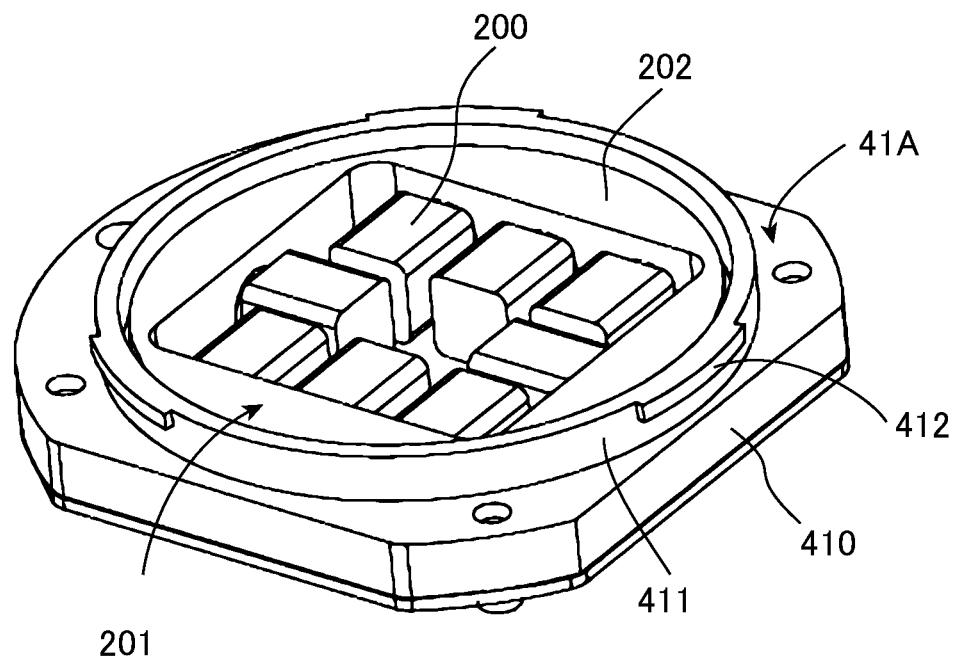
FIG. 17B is a perspective view of the holding portion viewed from the back side of FIG. 17A.

As illustrated in FIGS. 17A and 17B, the workpiece 201 is held by the holding portion 41A. As described later, when the holding portion 41A is attached to the supporting portion 42A, the holding portion 41A and the supporting portion 42A constitute a supporting mechanism 40B that supports the workpiece 201 (see FIG. 20). The holding portion 41A can be attached to and detached from the supporting portion 42A in a direction orthogonal to the plane P, and includes a body portion 410, a projection portion 411, and first projections 412. The body portion 410 holds the workpiece 201. The configuration in which the workpiece 201 is held by the body portion 410 is the same as that of the first embodiment.

As illustrated in FIG. 17B, the projection portion 411 projects from the back surface of the body portion 410 in a direction orthogonal to the plane P (FIG. 13B). The back surface of the body portion 410 is a surface located on a side on which the holding portion 41A is supported by the supporting portion 42A. The projection portion 411 is formed like a cylinder so that the back surface of the workpiece 201 is exposed from the inside of the projection portion 411. The first projections 412 project from the outer circumferential surface of the projection portion 411 in a direction parallel with the plane P (outward in the radial direction of the cylindrical projection portion 411). The first projections 412 are formed at a plurality of positions (three positions in the present embodiment) on the outer circumferential surface of the projection portion 411, spaced from each other.

Figure 18A:
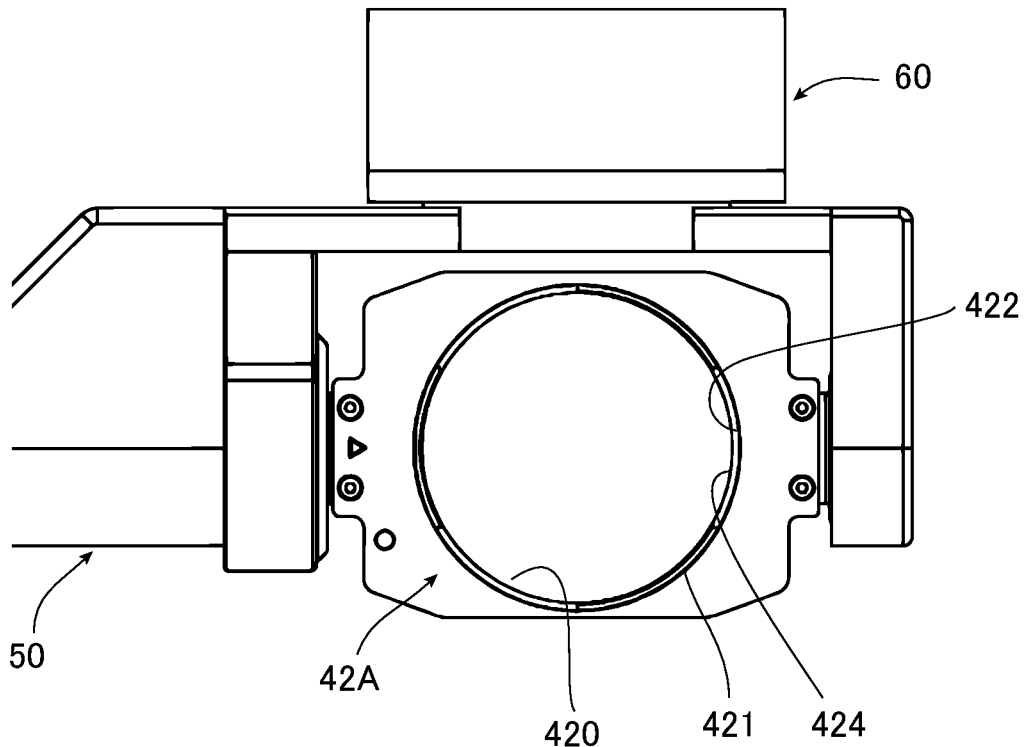
FIG. 18A is a plan view of a first rotating mechanism including a supporting portion of the second embodiment.
Figure 18B:
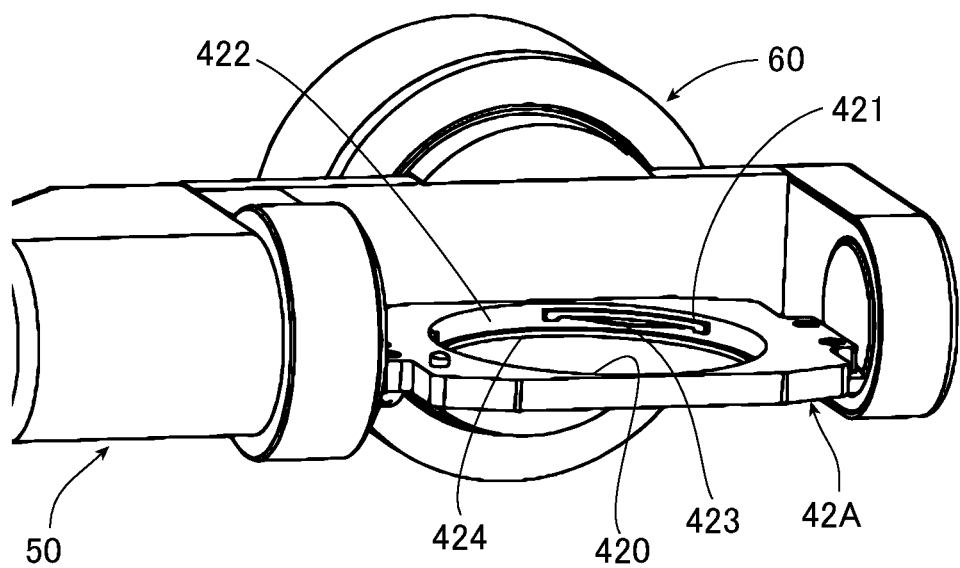
FIG. 18B is a perspective view of the first rotating mechanism including the supporting portion of the second embodiment.

As illustrated in FIGS. 18A and 18B, the supporting portion 42A includes an opening portion 420, second projections 421, insertion portions 422, and plate springs 423 that serve as urging portions. The opening portion 420 is a cylindrical hole, and has an inner diameter that allows the projection portion 411 of the holding portion 41A to be inserted into the opening portion 420. The opening portion 420 passes through the supporting portion 42A. Thus, in a state where the holding portion 41A is attached to the supporting portion 42A, the machining tool can machine the back surface of the workpiece 201 through the inside of the opening portion 420 and the projection portion 411.

The second projections 421 project from the inner circumferential surface of the opening portion 420 in a direction parallel with the plane P (inward in the radial direction of the cylindrical opening portion 420). The second projections 421 are formed at a plurality of positions (three positions in the present embodiment) on the inter circumferential surface of the opening portion 420, spaced from each other. In addition, the first projections 412 are the same in number as the second projections 421. In addition, in a state where the projection portion 411 is attached to the opening portion 420, the second projections 421 are located downstream of the first projections 412 in a direction in which the opening portion 420 is inserted to the projection portion 411.

The insertion portions 422 are portions at which the second projections 421 are not formed on the inner circumferential surface of the opening portion 420. When the projection portion 411 is inserted into the opening portion 420, the insertion portions 422 formed at the positions at which the second projections 421 are not formed allow the first projections 412 to be inserted downstream of the second projections 421 in the insertion direction of the projection portion 411. In the present embodiment, the insertion portions 422 are the same in number as the first projections 412, and are in phase with the first projections 412 in the circumferential direction. In addition, the length of each of the insertion portions 422 in the circumferential direction is larger than the length of each of the first projections 412 in the circumferential direction. Thus, when the projection portion 411 is inserted into the opening portion 420, the first projections 412 pass through the insertion portions 422, without interfering with the second projections 421.

Figure 20A:
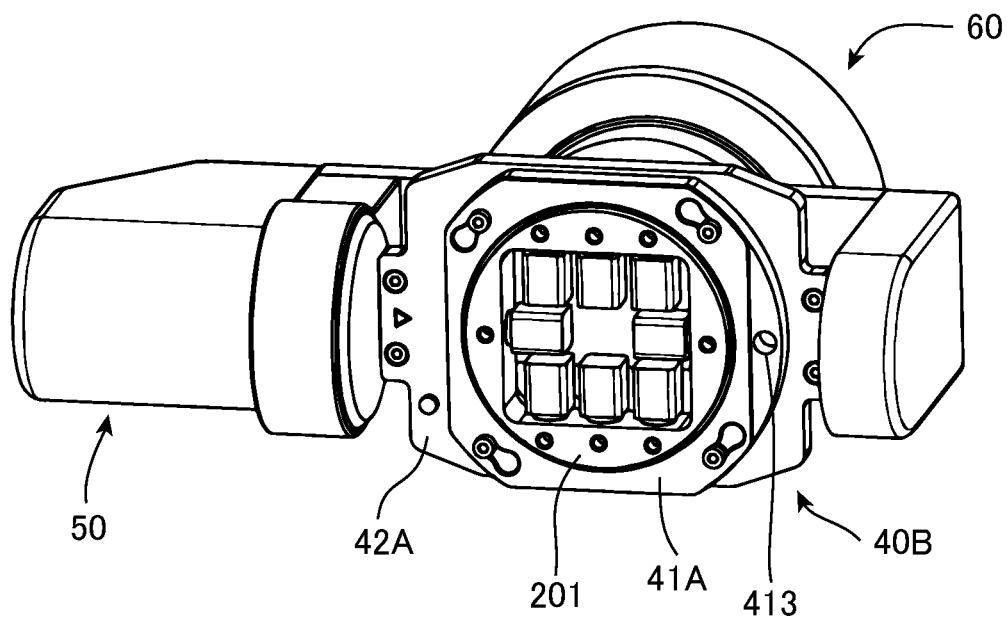
FIG. 20A is a perspective view illustrating a state in which the holding portion is attached to the supporting portion in the second embodiment.
Figure 20B:
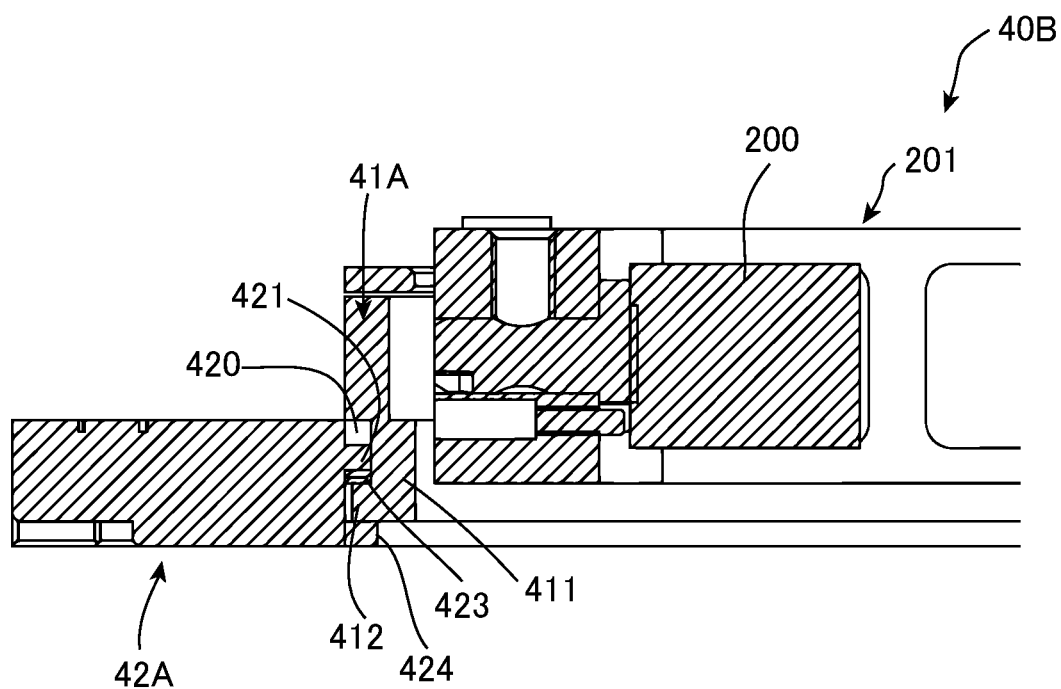
FIG. 20B is a cross-sectional view illustrating the state in which the holding portion is attached to the supporting portion in the second embodiment.

As illustrated in FIG. 18B, the plate springs 423 are disposed below the second projections 421 (i.e., downstream of the second projections 421 in the insertion direction of the projection portion 411). In addition, as illustrated in FIG. 20B, in a state where the first projections 412 and the second projections 421 overlap with each other in the insertion direction of the projection portion 411, the plate springs 423 are located between the first projections 412 and the second projections 421, and urge the first projections 412 and the second projections 421 toward a direction in which the first projections 412 and the second projections 421 are separated from each other. Note that the plate spring 423 may be formed such that a predetermined range of center portion of the plate spring 423 in the circumferential direction is located lower than both edge portions of the plate spring 423, and that the plate spring 423 is inclined upward from the predetermined range of center portion to both edge portions of the plate spring 423. In this configuration, as described later, when the first projection 412 is moved into a space below the second projection 421 by rotating the holding portion 41A relative to the supporting portion 42A, the first projection 412 is guided by both edge portions of the plate spring 423, smoothly to the predetermined range of center portion of the plate spring 423.

In addition, the supporting portion 42A has an abutment portion 424 formed on the inner circumferential surface of the opening portion 420, below the second projections and the plate springs 423 (i.e., downstream of the projection portion 411 in the insertion direction). The abutment portion 424 is formed on the whole circumference of the opening portion 420 so as to project from the inner circumferential surface of the opening portion 420, inward in the radial direction. In the state where the holding portion 41A is attached to the supporting portion 42A, the leading end of the projection portion 411 in the insertion direction of the projection portion 411 is in contact with the abutment portion 424. That is, as illustrated in FIG. 20B, when the first projections 412 and the second projections 421 are urged by the plate springs 423 in a direction in which the first projections 412 and the second projections 421 are separated from each other, the projection portion 411 having the first projections 412 is further pushed downstream in the insertion direction and abutted against the abutment portion 424. As a result, the frictional force between the first projections 412 and the abutment portion 424 increases, so that the holding portion 41A is fixed to the supporting portion 42A.

Note that when the holding portion 41A is attached to the supporting portion 42A, one portion of a surface (lower surface) of the body portion 410 of the holding portion 41A on the insertion direction side and one portion of the periphery of the opening portion 420 of the supporting portion 42A may abut against each other. Also in this case, since the first projections 412 and the second projections 421 are urged by the plate springs 423 in a direction in which the first projections 412 and the second projections are separated from each other, the frictional force between the one portion of the lower surface of the body portion 410 and the one portion of the periphery of the opening portion 420 (the one portion of the lower surface and the one portion of the periphery are in contact with each other) increases, so that the holding portion 41A is fixed to the supporting portion 42A.

Figure 19A:
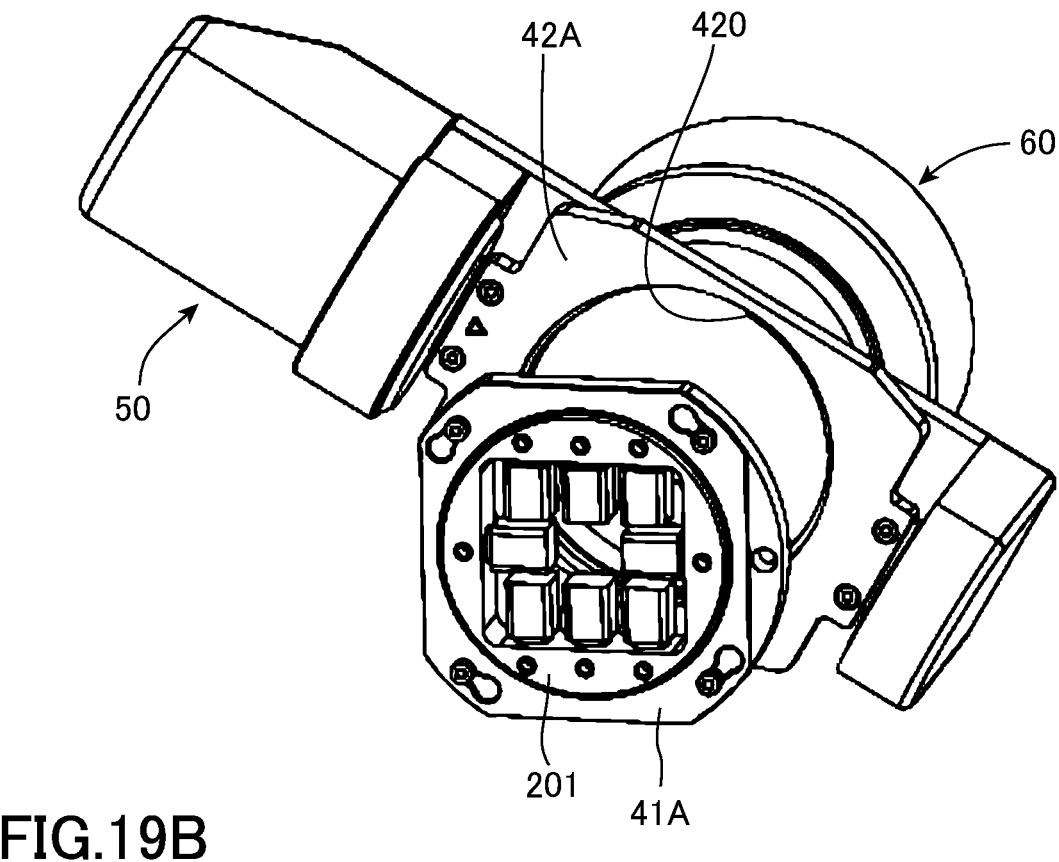
FIG. 19A is a perspective view illustrating a state in which the holding portion is still not inserted to the supporting portion in the second embodiment.
Figure 19B:
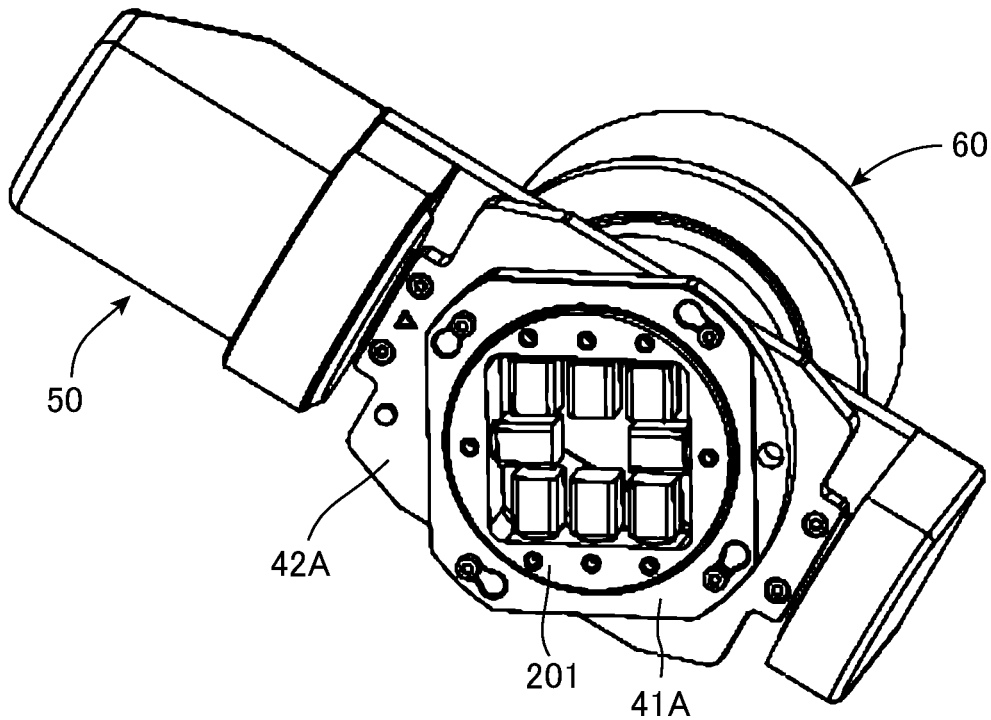
FIG. 19B is a perspective view illustrating a state in which the holding portion is inserted to the supporting portion in the second embodiment.

An operation of attaching the holding portion 41A to the supporting portion 42A will be described with reference to FIGS. 19A and 19B. As illustrated in FIG. 19A, when the holding portion 41A is attached to the supporting portion 42A, the holding portion 41A is moved to the supporting portion 42A in a direction orthogonal to the plane P. When the holding portion 41A is moved to the supporting portion 42A, the holding portion 41A is rotated with respect to the supporting portion 42A by a predetermined angle in the rotational direction so that the first projections 412 of the holding portion 41A and the insertion portions 422 of the supporting portion 42A are in phase with each other. Then, as illustrated in FIG. 19B, the projection portion 411 of the holding portion 41A is inserted into the opening portion 420 of the supporting portion 42A. Specifically, the projection portion 411 is inserted into the opening portion 420 until the first projections 412 are located downstream of the second projections 421 in the insertion direction.

Then, in the state of FIG. 19B, the holding portion 41A is rotated relative to the supporting portion 42A. That is, in the state where the first projections 412 have passed through the insertion portions 422, the holding portion 41A and the supporting portion 42A are rotated relative to each other, so that a state of FIG. 20A is obtained. FIG. 20A illustrates the state where the attachment of the holding portion 41A to the supporting portion 42A is completed. In this state, the first projections 412 are located downstream of the second projections 421 and the plate springs 423 in the insertion direction, and as described above, the first projections 412 and the second projections 421 are urged by the plate springs 423 in a direction in which the first projections 412 and the second projections 421 are separated from each other. As a result, the holding portion 41A is attached and fixed to the supporting portion 42A.

On the other hand, when the holding portion 41A is detached from the supporting portion 42A, the holding portion 41A is rotated relative to the supporting portion 42A toward a direction opposite to the direction toward which the holding portion 41A is rotated in the attachment, so that the first projections 412 and the insertion portions 422 are in phase with each other. In this state, the holding portion 41A is moved toward a direction opposite to the direction toward which the holding portion 41A is inserted, and the projection portion 411 is pulled out of the opening portion 420. With this operation, the operation of detaching the holding portion 41A from the supporting portion 42A is completed.

Note that although the plate springs 423 are disposed in the supporting portion 42A in the above description, the plate springs 423 may be disposed in the holding portion 41A. In this case, it is preferable that the plate springs 423 are disposed upstream of the first projections 412 in the insertion direction. In this configuration, in a state where the plate springs 423 are located between the first projections 412 and the second projections 421, the plate springs 423 urge the first projections 412 and the second projections 421 in a direction in which the first projections 412 and the second projections 421 are separated from each other. That is, the plate springs 423 have only to be disposed in either the holding portion 41A or the supporting portion 42A.

The above-described attachment/detachment operation of the holding portion 41A to/from the supporting portion 42A may be performed manually. In the present embodiment, however, the operation is performed automatically. Note that when the operation is performed manually, it is preferable that the supporting mechanism 40B is rotated by the first rotating mechanism 50 for setting an angle of the supporting mechanism 40B at which the holding portion 41A is easily held by a hand. For example, the supporting mechanism 40B may be inclined such that the front surface of the workpiece 201 faces upward in a state where the center of rotation of the holding portion 41A with respect to the supporting portion 42A has an angle equal to or larger than 30° and equal to or smaller than 60°, with respect to the b-axis.

Figure 21A:
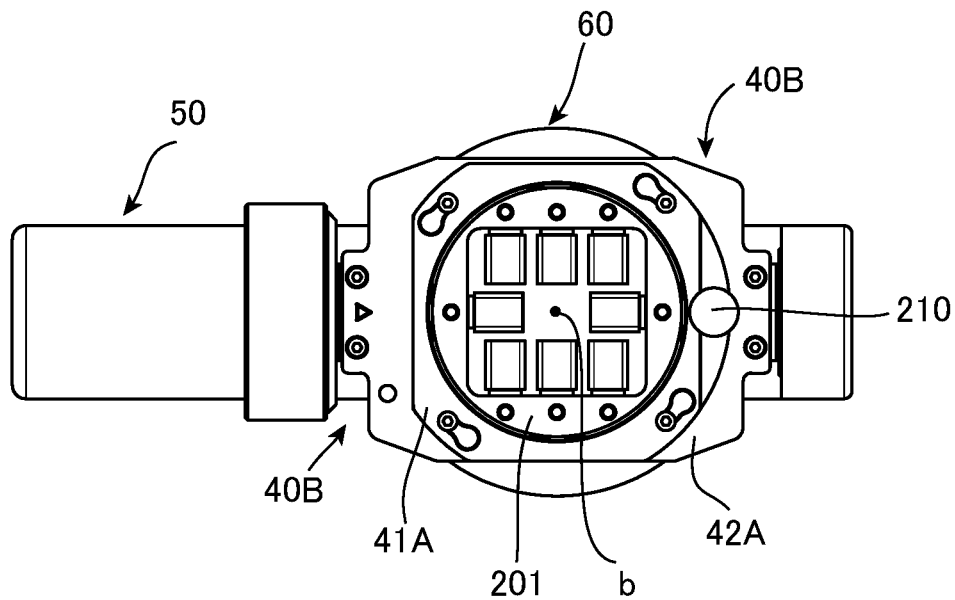
FIG. 21A is a plan view illustrating a configuration in which the holding portion is prevented from rotating for attaching or detaching the holding portion in the second embodiment.
Figure 21B:
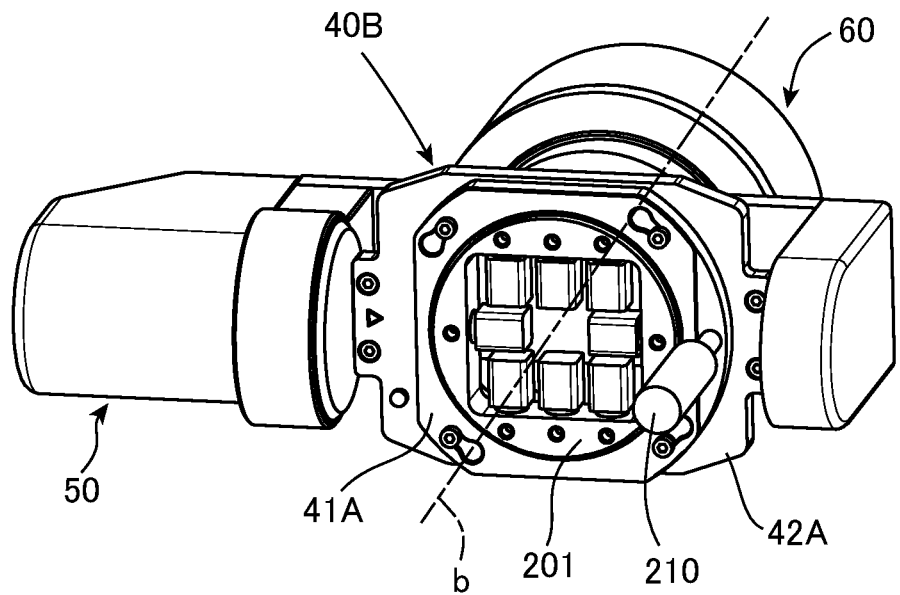
FIG. 21B is a perspective view illustrating the configuration in which the holding portion is prevented from rotating for attaching or detaching the holding portion in the second embodiment.

Hereinafter, an attachment-and-detachment operation performed automatically will be described with reference to FIGS. 21 and 22. When the holding portion 41A is detached from the supporting portion 42A, a jig 210 is inserted into a jig hole 413 formed in one portion of the holding portion 41A (see FIGS. 17A and 20A), as illustrated in FIGS. 21A and 21B. When the jig 210 is inserted into the jig hole 413, the supporting mechanism 40B is rotated by the first rotating mechanism 50 so that the front surface of the workpiece 201 faces a direction opposite to the second rotating mechanism 60. In this case, it is preferable that the center of rotation of the holding portion 41A with respect to the supporting portion 42A is aligned with the b-axis.

Figure 22A:
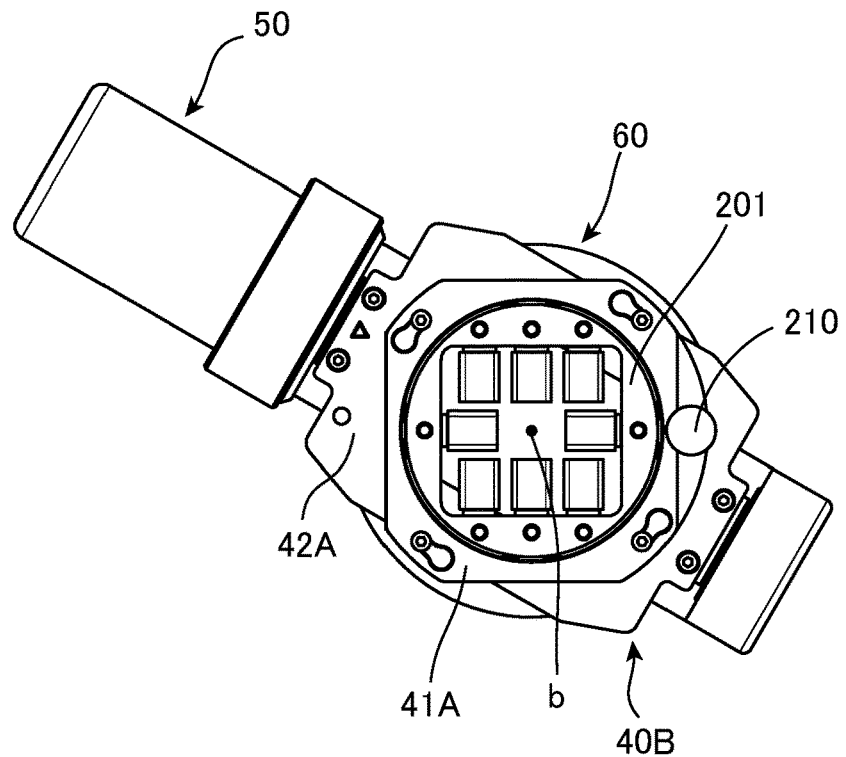
FIG. 22A is a plan view illustrating a state in which the supporting mechanism is rotated on the b-axis from the state of FIG. 21A.
Figure 22B:
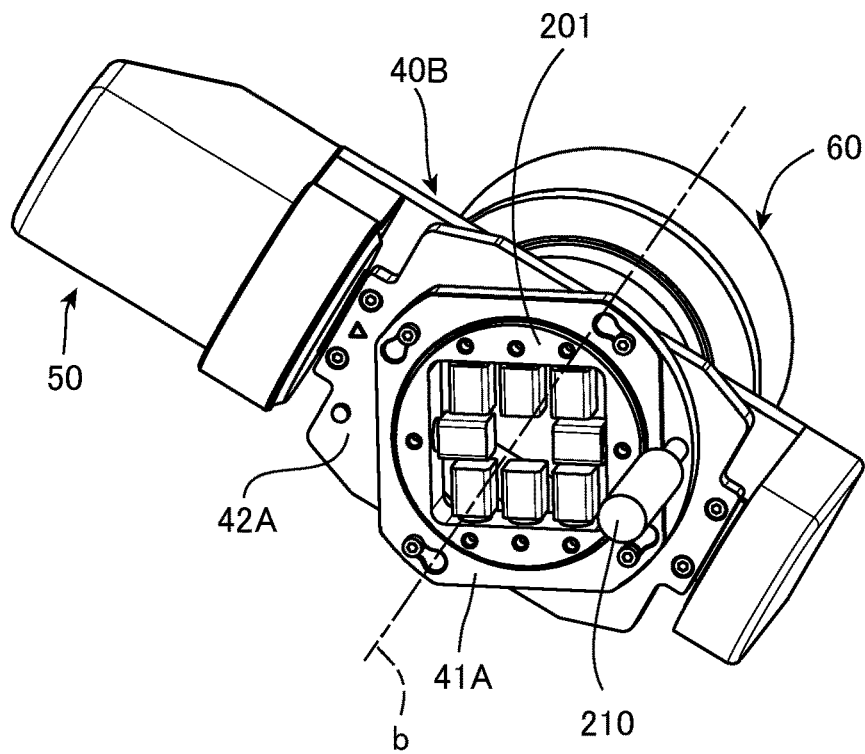
FIG. 22B is a perspective view illustrating the state in which the supporting mechanism is rotated on the b-axis from the state of FIG. 21B.

In this state, the supporting mechanism 40B and the first rotating mechanism 50 are rotated on the b-axis by the second rotating mechanism 60, as illustrated in FIGS. 22A and 22B. While the supporting mechanism 40B and the first rotating mechanism 50 are rotated, the holding portion 41A is prevented from rotating because the jig 210 is inserted to the hole 413. That is, the holding portion 41A is prevented from rotating, by the jig 210. Thus, when the supporting mechanism 40B is rotated on the b-axis by the second rotating mechanism 60, the holding portion 41A and the supporting portion 42A are rotated relative to each other. In addition, the rotation angle by which the holding portion 41A and the supporting portion 42A are rotated relative to each other allows the first projections 412 and the insertion portions 422 to be in phase with each other. With this operation, the holding portion 41A can be detached from the supporting portion 42A.

On the other hand, when the holding portion 41A is attached to the supporting portion 42A, the projection portion 411 of the holding portion 41A is inserted into the opening portion 420 of the supporting portion 42A, as illustrated in FIGS. 22A and 22B. In addition, the holding portion 41A is prevented in advance from rotating, by the jig 210. Then the second rotating mechanism 60 is rotated toward a direction opposite to the direction toward which the second rotating mechanism 60 is rotated for detaching the holding portion 41A as described above, so that the holding portion 41A is attached to the supporting portion 42A as illustrated in FIGS. 21A and 21B.

Note that although the description has been made for the case where the process for rotating the holding portion 41A and the supporting portion 42A relative to each other by rotating the second rotating mechanism 60 is automated (semi-automated), all processes of the attachment-and-detachment operation may be automated.

For example, a robot hand holds the holding portion 41A, moves the holding portion 41A to the supporting portion 42A, and inserts the projection portion 411 of the holding portion 41A into the opening portion 420 of the supporting portion 42A. Then, in a state where the holding portion 41A is held by the robot hand for preventing the holding portion 41A from rotating, the holding portion 41A and the supporting portion 42A are rotated relative to each other by rotating the second rotating mechanism 60, as described above. When the holding portion 41A is detached, the second rotating mechanism 60 is rotated toward a direction opposite to the direction toward which the second rotating mechanism 60 is rotated for the attachment, in a state where the holding portion 41A is held by the robot hand for preventing the holding portion 41A from rotating. Then the robot hand that is holding the holding portion 41A is moved toward a direction opposite to the insertion direction. With these operations, the operation of attaching/detaching the holding portion 41A to/from the supporting portion 42A can be performed automatically.

Thus, by utilizing the rotation of the second rotating mechanism 60, the operation of attaching/detaching the holding portion 41A to/from the supporting portion 42A can be automated or semi-automated. As a result, the efficiency of work, such as replacing a workpiece, can be increased. Note that even when the attachment-and-detachment operation is performed manually, the rotation of the second rotating mechanism 60 may be utilized.

Third Embodiment

A third embodiment will be described with reference to FIGS. 23 to 27. The present embodiment relates to a configuration in which the machining tool (hereinafter referred as to a tool or a cutting tool) is clamped to or unclamped from the spindle in the machining apparatus (machine tool) described in the first and the second embodiments.

For example, for unclamping the tool from the spindle, there is a known technique in which the tool is unclamped by actuating fluid such as air or hydraulic oil (see Japanese Patent Application Publication No. 2018-1323).

In addition to the hydraulic system described in Japanese Patent Application Publication No. 2018-1323, there is a technique in which the tool is unclamped by using air pressure. Such a technique requires high air pressure for opening a spindle chuck against the force of a spring disposed in the spindle chuck. If the spindle chuck is required to be opened by low air pressure, it is necessary to reduce the force of the spring. In this case, however, since the spindle cannot firmly hold the cutting tool, it may cause trouble. Thus, it is desired that the spindle chuck is closed by a strong spring and firmly holds the cutting tool during machining, and that the spindle chuck is opened by high air pressure and releases the cutting tool after the machining. In this case, a pressure booster valve may be used for boosting the air pressure. The pressure booster valve operates when the difference in air pressure between input and output is equal to or larger than a predetermined value. However, when the difference in air pressure is smaller than the predetermined value, the pressure booster valve may not operate.

The present embodiment provides a technique that easily stabilizes output from the pressure booster valve in a simple method. That is, in the machining apparatus of the present embodiment, the pressure booster valve connected to an air compressor opens the machining-tool chuck. In particular, before the machining tool is held by the chuck, air is sent to the chuck through the pressure booster valve. In this configuration, the output from the pressure booster valve is stabilized and the tool is easily clamped in a simple method. Thus, the machining apparatus can machine a workpiece stably.

Figure 23:
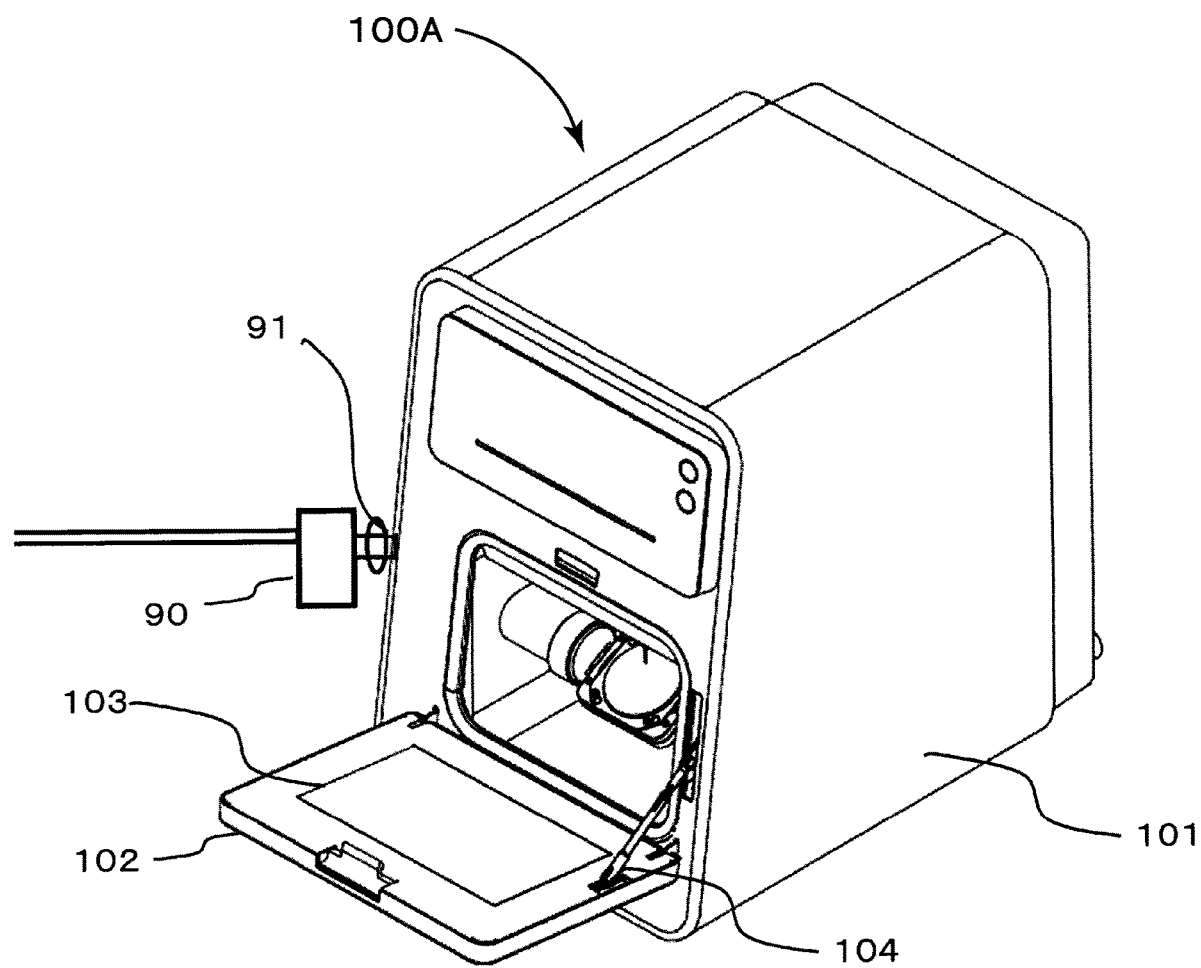
FIG. 23 is a perspective view of an external appearance of a machining apparatus of a third embodiment.

Hereinafter, a machining apparatus 100A of the present embodiment will be described with reference to FIGS. 23 to 25. FIG. 23 is a perspective view of an external appearance of the machining apparatus 100A of the present embodiment. In the machining apparatus 100A, a pressure booster valve 90 is attached to an air compressor (not illustrated) that generates air. The pressure booster valve 90 unclamps the later-described chuck by using the air whose pressure is boosted. The pressure booster valve 90 is followed by an air-pressure detection sensor 91. The air-pressure detection sensor 91 may be disposed inside the machine tool for measuring the pressure applied to the chuck for the tool. As illustrated in FIG. 23, in the machining apparatus 100A, the body of the machining apparatus is housed by an exterior cover 101. The exterior cover 101 includes an open-and-close door 102. The workpiece can be replaced by opening the open-and-close door 102. The open-and-close door 102 is closed while the workpiece is machined. The opening and closing of the open-and-close door 102 are detected by a sensor (not illustrated).

The open-and-close door 102 includes a translucent window 103. An open-and-close rod 104 is attached to a portion of the open-and-close door 102 in which the window 103 is not disposed. Thus, the open-and-close door 102 is opened slowly by the action of a shock absorber mechanism (not illustrated) disposed in the open-and-close rod 104. Thus, the open-and-close door 102 can be opened and closed easily, the window 103 hardly receives strong shock, and the translucent portion of the window 103 hardly breaks.

Figure 24A:
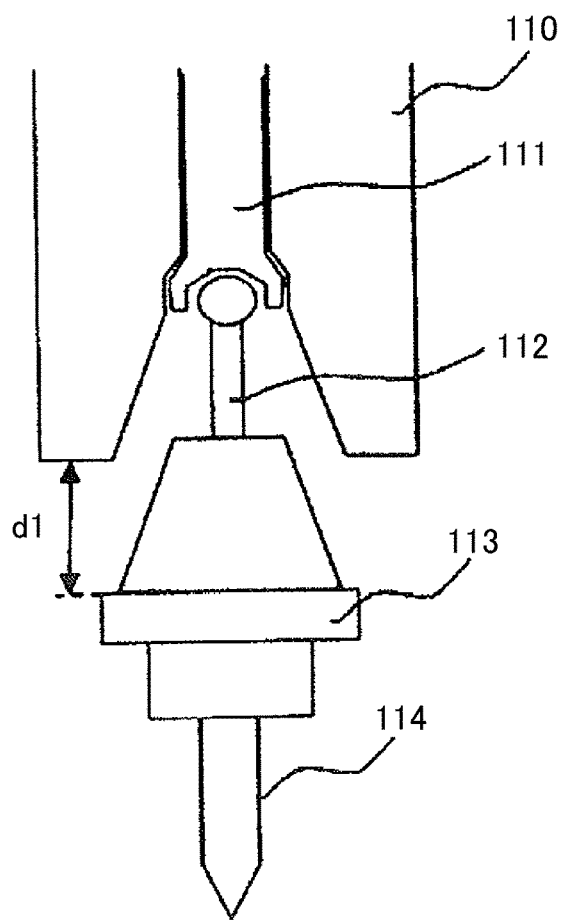
FIG. 24A is a cross-sectional view illustrating a state in which a tool of the third embodiment is still not clamped.

Next, FIG. 24A will be described. FIG. 24A illustrates a state before the tool is clamped, and in this state, the tool holder 113 is separated from the spindle 110. A tool 114 is attached to the tool holder 113. Note that the spindle 110 is one example of the spindle 11, and shows a structure of the above-described spindle 11.

In this state, the distance between the spindle 110 and a flange portion of the tool holder 113 is denoted by dl. The tool holder 113 includes a pull stud 112, which is pulled by a draw bar 111 toward a thrust direction of the spindle 110.

When the draw bar 111 pulls the pull stud 112, the claws of the draw bar 111 catch a projecting end portion of the pull stud 112 and pull the pull stud 112. The tool is chucked, depending on the position of the draw bar 111.

Figure 24B:
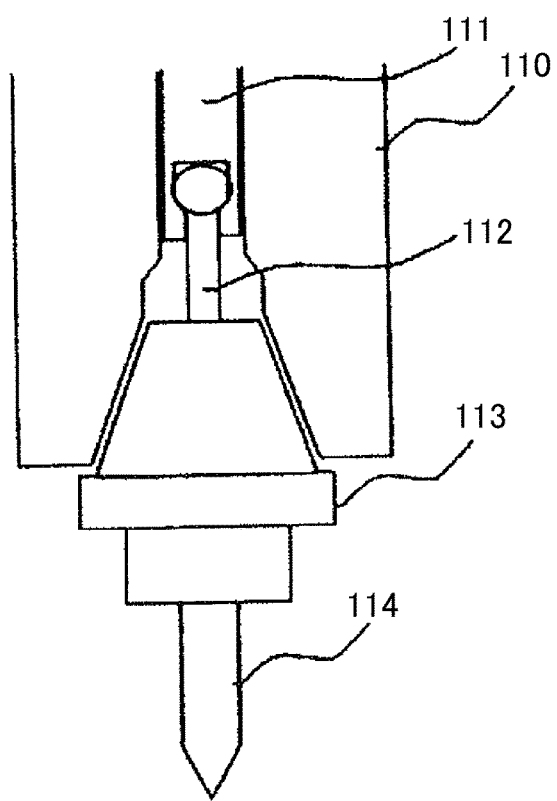
FIG. 24B is a cross-sectional view illustrating a state in which the tool of the third embodiment is clamped.

Next, FIG. 24B will be described. FIG. 24B illustrates a state after the tool is clamped, and in this state, the tool holder 113 and the spindle 110 are in contact with each other. In addition, as described previously, the projecting end portion of the pull stud 112 is caught by the claws of the drawbar 111. In the state of FIG. 24B, air is blown out. As a result, the draw bar 111 changes its state into the state illustrated in FIG. 24A, so that the machining tool can be replaced.

Figure 25:
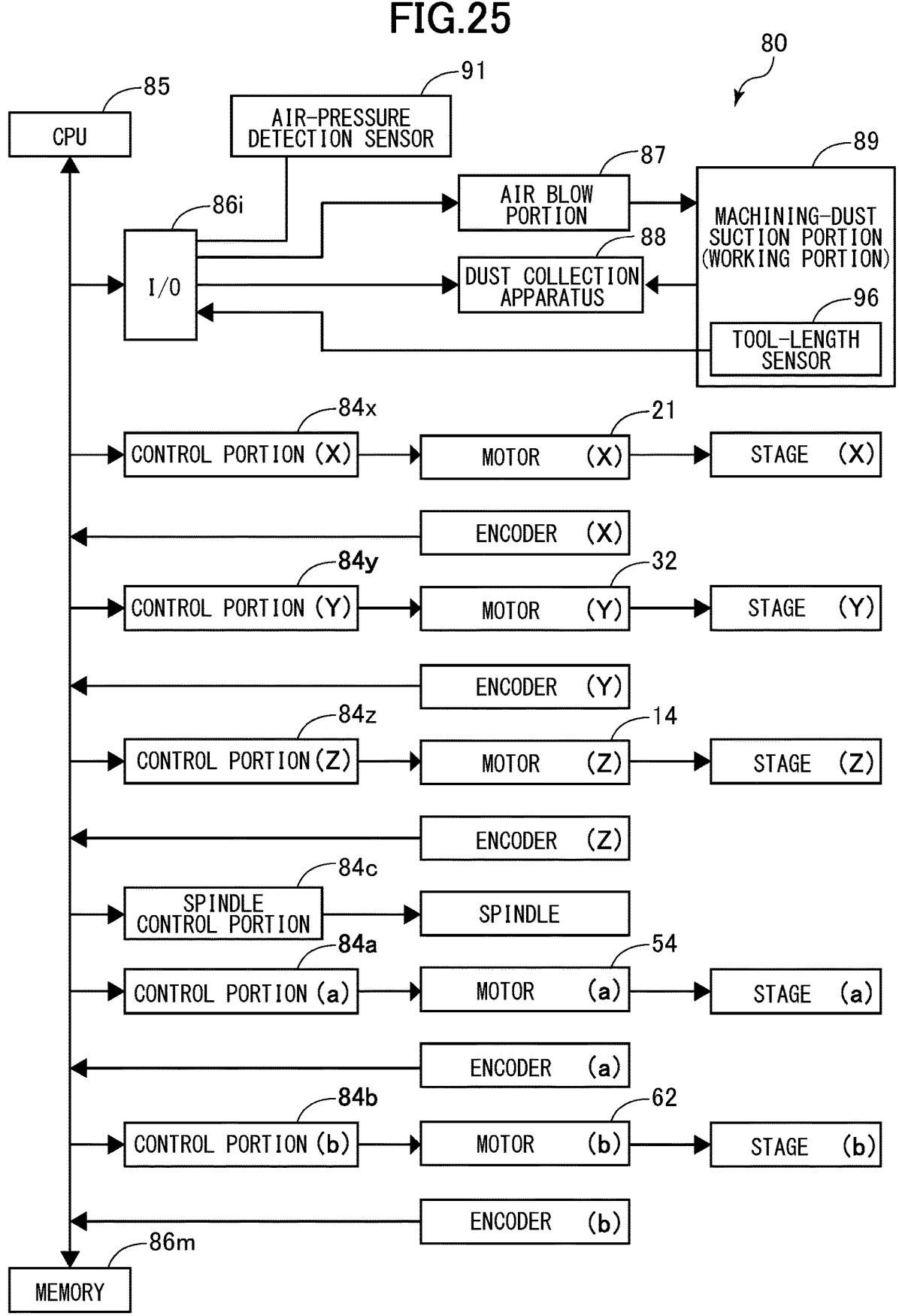
FIG. 25 is a control block diagram of the machining apparatus of the third embodiment.

As illustrated in FIG. 25, the electric unit 80 includes a CPU 85 that serves as a computation unit, an input/output (I/O) port 86*i*, motor control portions, 84*x*, 84*y*, and 84*z*, a spindle control portion 84*c*, an a-axis control portion 84*a*, and a b-axis control portion 84*b*. The CPU 85 uses a memory 86*m* and performs various computations, depending on data and signals that the CPU 85 has received.

The I/O 86*i* is connected to an air blow portion 87, a dust collection apparatus 88, and a tool-length sensor 96 of the body portion of the machining apparatus. The air blow portion 87 blows air on the tool attached to the spindle 110, for cooling the tool and removing machining dust having adhered to the tool. Foreign material, such as the machining dust removed from the tool and machining dust left (after the machining) on the supporting mechanism 40 and the first rotating mechanism 50 (the supporting mechanism 40 and the first rotating mechanism 50 serves as a workpiece holding apparatus), is sucked by a machining-dust suction portion 89 disposed in the workpiece holding apparatus, and collected by the dust collection apparatus 88. The tool-length sensor 96 is disposed in the vicinity of the tool magazine 70, as illustrated in FIG. 1 as an example (in FIG. 1, the tool-length sensor 96 is disposed on the supporting frame 53 of the first rotating mechanism 50, as an example). The tool-length sensor 96 detects the length of the tool by using a touch sensor method, and sends a detection result to the CPU 85. For example, the length of the tool is detected by moving the spindle to a position located above the tool-length sensor 96, in a state where the tool is chucked by the spindle, and then by lowering the spindle and bringing the leading end of the tool into contact with the tool-length sensor 96.

The motor control portions, 84*x*, 84*y*, and 84*z*, disposed in the CPU 85 drive the motors 21, 32, and 14 of X, Y, and Z, depending on instructions from the CPU 85. Each of the motors 21, 32, and 14 is provided with an encoder. For example, the encoder detects the number of rotations, a rotation angle, and a rotational direction of the rotary shaft of a corresponding one of the motors 21, 32, and 14. Thus, the encoder detects the amount of movement (current position) of a corresponding one of stages X, Y, Z driven by the motors 21, 32, and 14. Note that the stage X is a portion that is driven by the motor 21 and that moves the spindle 110 in the X-axis direction, the stage Y is a portion that is driven by the motor 32 and that moves the workpiece holding apparatus in the Y-axis direction, and the stage Z is a portion that is driven by the motor 14 and that moves the spindle 110 in the Z-axis direction.

The spindle control portion 84*c* controls the motor 13 (see FIG. 1) that rotates the spindle 110, and thereby controls the rotation speed of the spindle (spindle). In addition, the a-axis control portion 84*a* and the b-axis control portion 84*b* respectively drive the a-axis motor 54 and the b-axis motor 62, depending on an instruction from the CPU 85.

Thus, by the CPU 85 controlling each component of the body portion of the machining apparatus, predetermined machining is performed on the workpiece W that is held as described above.

Figure 26:
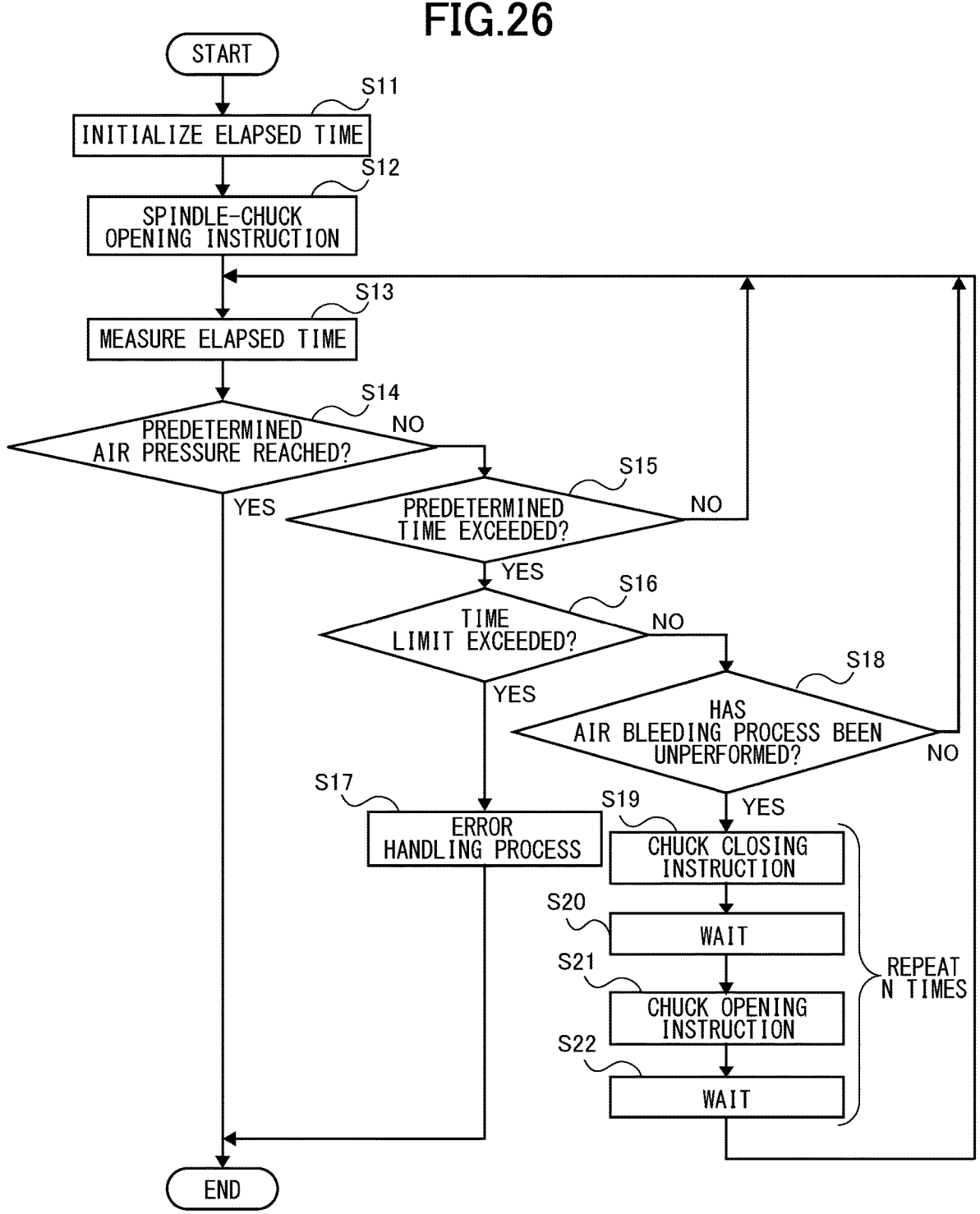
FIG. 26 is a control flowchart of the machining apparatus of the third embodiment.

FIG. 26 illustrates a control flowchart of the machining apparatus of the present embodiment. Each operation is performed by the CPU 85 loading a program into the memory 86*m*, performing computation, and executing the program. In the machining apparatus that causes the pressure booster valve 90 connected to the air compressor, to open the machining-tool chuck, air is sent to the chuck through the pressure booster valve 90 before the machining tool is held by the chuck (draw bar 111), so that the unclamping can be stably performed even when the pressure booster valve 90 is used.

Specifically, the control may be performed in steps S11 to S22. As a feature, the air-pressure detection sensor 91 may be provided for detecting the pressure of air having passed through the pressure booster valve 90. In this case, if the air pressure detected by the air-pressure detection sensor 91 is lower than a predetermined air pressure, the air is sent to the chuck. Since the air pressure is detected, the operations can be performed while the excess and deficiency of air is more accurately detected.

Hereinafter, a procedure performed when a tool is held, for stabilizing the air pressure of the output side of the pressure booster valve 90 will be specifically described with reference to FIG. 26. When a spindle-chuck opening process is started (start), the CPU 85 stores a measurement start time in a variable that stores elapsed time, for measuring the time that has elapsed since the state of the spindle chuck was changed from a spindle-chuck closed state to an open state (S11). That is, the CPU 85 initializes the elapsed time. Then the CPU 85 sends a chuck opening instruction to the spindle (S12), and measures a time that has elapsed since the chuck opening instruction was sent (S13). The elapsed time is determined by calculating the difference between the measurement start time and the current time.

The CPU 85 then checks whether the air pressure of the spindle chuck has reached a predetermined air pressure, by using the air-pressure detection sensor 91 (not illustrated) (S14). If the air pressure has reached the predetermined air pressure in S14, then the CPU 85 normally ends the procedure that stabilizes the air pressure of the output side of the pressure booster valve 90 (end). If the air pressure has not reached the predetermined air pressure in S14, the CPU 85 does not immediately determine that an error has occurred. This is because it may take time to boost the air pressure. Thus, for waiting until the air pressure is boosted up to the predetermined pressure, the CPU 85 checks whether the elapsed time measured in S13 has reached a predetermined time (S15).

If the predetermined time has not been reached in S15, then the CPU 85 returns to S13, and measures the elapsed time again. If the predetermined time has been reached in S15, then the CPU 85 checks whether a predetermined time limit has been exceeded (S16). If the predetermined time limit has been exceeded in S16, then the CPU 85 executes an error handling process (S17), and ends the procedure, as an error, that stabilizes the air pressure of the pressure booster valve 90 (end). If the predetermined time limit has not been exceeded in S16, then the CPU 85 checks whether an air bleeding operation was performed (S18).

If the CPU 85 determines in S18 that the air bleeding operation was not performed, then the CPU 85 closes the spindle chuck (S19), waits for a predetermined time (S20), opens the chuck (S21), and waits for a predetermined time (S22). The CPU 85 repeats the steps S19 to S22 predetermined times. With these operations, the air of the output side of the pressure booster valve 90 leaks little by little. Thus, when the difference in pressure between the input side and the output side of the pressure booster valve 90 is small, the air pressure of the output side of the pressure booster valve 90 can be decreased. As a result, the difference in pressure between the input side and the output side of the pressure booster valve 90 increases, so that the pressure booster valve 90 can be restarted and the air pressure of the output side can reach the predetermined air pressure.

After the above-described chuck opening-and-closing process, the CPU 85 returns to S13 and measures the elapsed time again. If the CPU 85 determines in S18 that the air bleeding operation was performed, then the CPU 85 returns to S13 and measures the elapsed time again.

Figure 27:
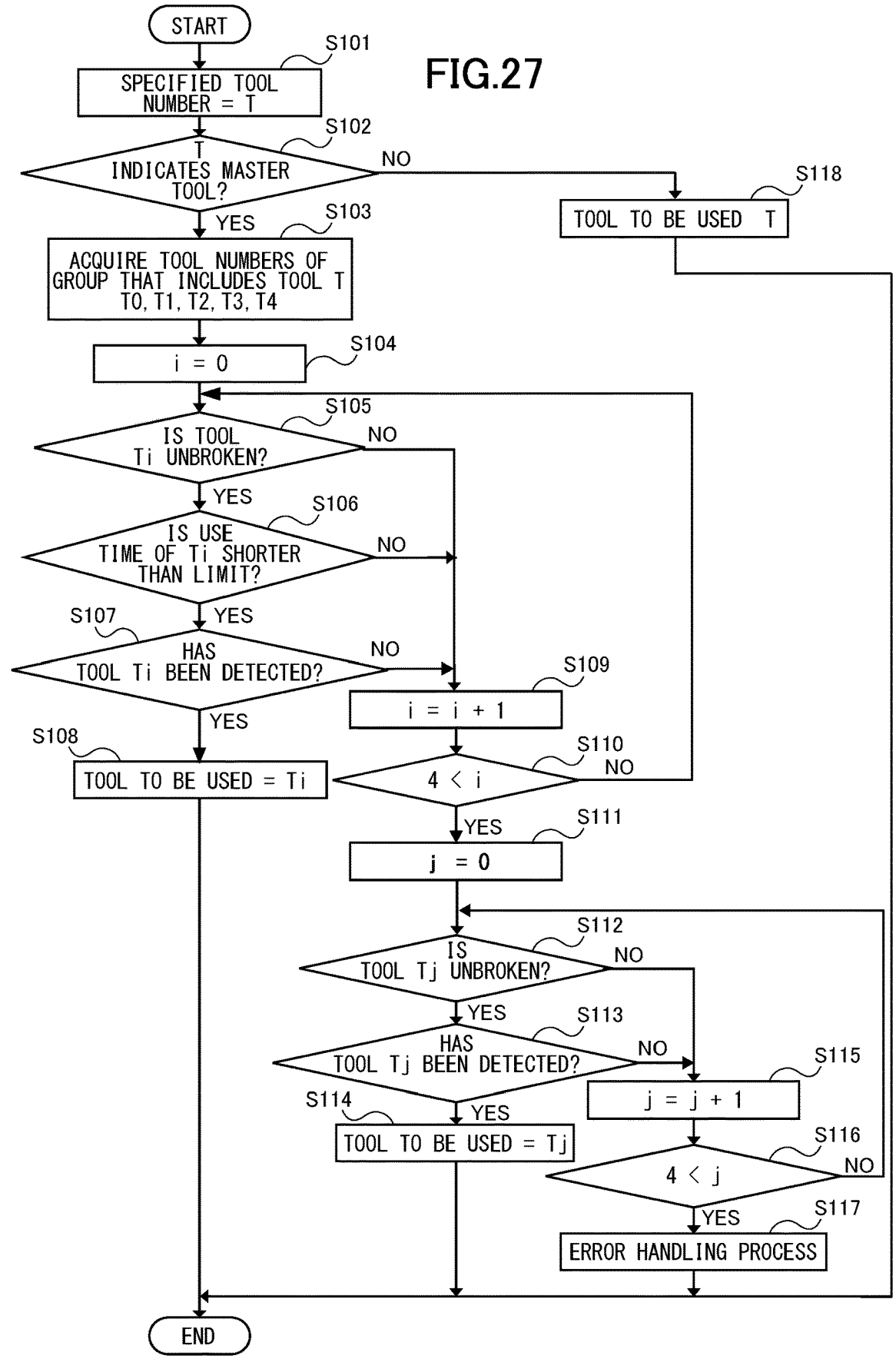
FIG. 27 is a control flowchart for selecting a tool.

FIG. 27 illustrates a control flowchart for selecting a tool. In the machining apparatus that exchanges one machining tool for another machining tool of a plurality of machining tools and machines an object, the machining apparatus selects one from among the plurality of machining tools and uses the machining tool. When using a machining tool, the machining apparatus selects the machining tool by performing a tool breakage detection on the plurality of machining tools, and depending on a time in which each of the machining tools has been used. The machining apparatus configured in this manner can use a tool in a state where the tool is more suitable for the machining.

Specifically, a tool used may be selected in accordance with the flowchart including steps S101 to S118. FIG. 27 illustrates control for selecting one from among five tools. However, a machining tool may be selected from among any number of machining tools as long as a single machining tool is selected from among a plurality of machining tools. In addition, an object can be more precisely machined by selecting a tool that is unbroken and that has the least time in which the tool has been used, from a plurality of machining tools. Each of operations for selecting a tool is performed by the CPU 85 loading a program into the memory 86m, performing computation, and executing the program. The CPU 85 may serve as a control unit. In another case, the CPU 85 may receive an instruction from an external device such as a PC, and perform each operation.

Hereinafter, a procedure for selecting a tool will be specifically described with reference to FIG. 27. In the present embodiment, a tool is selected from one master tool and four auxiliary tools. In FIG. 27, the master tool is denoted by T0, an auxiliary tool 1 is denoted by T1, an auxiliary tool 2 is denoted by T2, an auxiliary tool 3 is denoted by T3, and an auxiliary tool 4 is denoted by T4.

When a tool selection process is started (start), the CPU 85 stores a T-code value, as a tool number specified in an NC file (S101). Then the CPU 85 checks whether the T-code value indicates the master tool (S102).

If the specified tool number indicates the master tool in S102, then the CPU 85 obtains tool numbers of a group that includes the master tool (S103). The tool numbers correspond to previously-described T0, T1, T2, T3, and T4. Then the CPU 85 initializes a repetition variable i for sequentially examining the total of five tools to select an available tool (S104).

In the following steps, the CPU 85 examines available tools. First, the CPU 85 checks whether a tool Ti is unbroken (S105). If the CPU 85 determines in S105 that the tool Ti is unbroken, then the CPU 85 checks whether the time in which the tool Ti has been used is shorter than an allowable time (predetermined time) (S106). If the CPU 85 determines in S106 that the time in which the tool Ti has been used is shorter than the allowable time, then the CPU 85 determines whether the tool Ti has been detected (or is stored) in the tool magazine (ATC magazine) 70 (see FIG. 1 for example) (S107). If the CPU 85 determines in S107 that the tool Ti has been detected, then the CPU 85 selects the tool Ti as a tool to be used (S108), and ends the tool selection process (end).

If the CPU 85 determines NO in S105, S106, or S107, then the CPU 85 executes the following steps. That is, if the CPU 85 determines in S105 that the tool Ti is broken, then the CPU 85 adds 1 to the repetition variable i (S109). If the CPU 85 determines in S106 that the time in which the tool Ti has been used is equal to or longer than the allowable time, then the CPU 85 adds 1 to the repetition variable i (S109). If the CPU 85 determines in S107 that the tool Ti has not been detected, then the CPU 85 adds i to the repetition variable i (S109). After these steps, if the repetition variable i is equal to or smaller than 4 in S110, then the CPU 85 proceeds to S105 for examining the next tool. If the repetition variable i is larger than 4 in S110, then the CPU 85 initializes the repetition variable j (S111).

Hereinafter, the steps performed after S111 will be described. If the CPU 85 proceeds to S111, it is considered that the CPU 85 has not found any tool in its normal condition (in which the tool is unbroken, the time in which the tool has been used is shorter than the allowable time, and the tool is stored in the ATC magazine). Thus, for the second-best solution, the CPU 85 ignores the time in which the tools have been used, and searches for a tool that satisfies the other conditions (in which the tool is unbroken, and is stored in the ATC magazine) in the order of T0, T1, T2, T3, and T4.

First, the CPU 85 checks whether a tool Tj is unbroken (S112). If the CPU 85 determines in S112 that the tool Tj is unbroken, then the CPU 85 determines whether the tool Tj has been detected (or is stored) (S113). If the CPU 85 determines in S113 that the tool Tj has been detected, then the CPU 85 selects the tool Tj as a tool to be used (S114), and ends the tool selection process (end).

If the CPU 85 determines in S112 that the tool Tj is broken, or if the CPU 85 determines in S113 that the tool Tj has not been detected, then the CPU 85 adds 1 to the repetition variable j (S115). If the repetition variable j is equal to or smaller than 4 in S116, then the CPU 85 proceeds to S112 for examining the next tool. If the repetition variable j is larger than 4 in S116, then the CPU 85 executes an error handling process (S117) and ends the tool selection process, as error, because the CPU 85 has not found any available tool (end).

In addition, if the specified tool number does not indicate the master tool in S102, then the CPU 85 stores the T-code number as a tool to be used (S118) and ends the tool selection process (end).

Note that if a five-axis machining apparatus that rotates an object to be machined, on the a-axis and the b-axis, the machining apparatus may have the following features. That is, the Y-axis moving mechanism is disposed along a frame that extends in the Y-axis direction, and the Z-axis moving mechanism is disposed along a frame that extends along the Z-axis direction. In addition, the rotation axis that is the b-axis is disposed, in the Z-axis direction, below the frame that extends in the Y-axis direction, in a state where the a-axis is not inclined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The machining apparatus of the present invention is suitably used as a machining apparatus that machines a dental prosthesis, and as another machining apparatus that performs machining, such as cutting, on an object.

What is claimed is:

1. A machining apparatus comprising:
 a first frame comprising: (i) a first surface extending in a Z-axis direction, and (ii) a second surface orthogonal to the first surface and extending in a Y-axis direction;
 an X-axis moving mechanism disposed on the first surface of the first frame and configured for causing movement along an X-axis direction;
 a Z-axis moving mechanism disposed on the first surface of the first frame and configured for causing movement along the Z-axis direction;
 a Y-axis moving mechanism disposed on the second surface of the first frame and configured for causing movement along the Y-axis direction, wherein the X-axis direction, the Y-axis direction, and the Z-axis direction are mutually orthogonal;
 a second frame configured to support the first frame at the second surface of the first frame;
 an A-axis rotating mechanism configured to be moved by the Y-axis moving mechanism;
 a B-axis rotating mechanism configured to be moved by the Y-axis moving mechanism; and
 a supporting mechanism configured to be moved by the Y-axis moving mechanism and support an object to be machined,
 wherein the Y-axis moving mechanism is disposed in a space located below, in the Z-axis direction, the first frame and formed by the second frame,
 wherein the first frame is configured to support the X-axis moving mechanism, Y-axis moving mechanism and Z-axis moving mechanism.

2. The machining apparatus according to claim 1, wherein a guide plane of the Y-axis moving mechanism is located above a rotation center axis of the A-axis rotating mechanism and above, in the Z-axis direction, a rotation center axis of the B-axis rotating mechanism.

3. The machining apparatus according to claim 1, wherein the A-axis rotating mechanism is configured to rotate the supporting mechanism about an A-axis,
 the supporting mechanism comprising:
 a holding portion configured to hold the object at a position through which a plane extending along the A-axis passes, the holding portion being configured to hold the object such that an extension line of the A-axis passes through a center of the object, the center of the object being a center in a direction orthogonal to the plane, and
 a supporting portion configured to support the object via the holding portion, the supporting portion being linked with the A-axis rotating mechanism at a position shifted from the A-axis and located on one side in the direction orthogonal to the plane, with respect to the position at which the holding portion holds the object.

4. The machining apparatus according to claim 3, wherein the supporting mechanism comprises a pressing portion configured to press one portion of a periphery of the holding portion, the plane being configured to pass through the one portion of the periphery of the holding portion.

5. The machining apparatus according to claim 4, wherein a pressing direction of the pressing portion is inclined with respect to the plane so as to extend toward the one side rather than in a direction extending along the plane.

6. The machining apparatus according to claim 3, wherein the holding portion is configured to be detachably attached to the supporting portion such that the holding portion is removable from the supporting portion in a direction orthogonal to the plane, and the holding portion comprises:
 a body portion configured to hold the object,
 a projection portion projecting from the body portion in a direction orthogonal to the plane, and
 a first projection projecting from the projection portion in a direction parallel with the plane,
 wherein the supporting portion comprises:
 an opening portion into which the projection portion is inserted,
 a second projection projecting from an inner circumferential surface of the opening portion in a direction parallel with the plane, and
 an insertion portion formed in a position in which the second projection is not formed, and configured to allow the first projection to be inserted downstream of the second projection in an insertion direction of the projection portion when the projection portion is inserted into the opening portion, and
 wherein the machining apparatus comprises an urging portion disposed on one of the holding portion and the supporting portion and configured to
 be positioned between the first projection and the second projection in a state where the first projection and the second projection overlap with each other in the insertion direction, by rotating the holding portion and the supporting portion relative to each other in a state where the first projection is inserted into the insertion portion, and
 urge the first projection and the second projection in a direction in which the first projection and the second projection are separated from each other.

7. The machining apparatus according to claim 1, wherein the Z-axis moving mechanism is configured to move a machining tool in the Z-axis direction,
   wherein the machining apparatus comprises a tool holding portion comprising:
      a plurality of first tool-arrangement portions configured to allow a first plurality of machining tools to be disposed along a first line and to allow the machining tools to be detachably attached to the first tool-arrangement portions such that the machining tools are removable from the first-tool arrangement portions in a predetermined direction,
      a plurality of second tool-arrangement portions configured to allow a second plurality of machining tools to be disposed along a second line adjacent to and substantially parallel with the first line and to allow the machining tools of the second plurality of machining tools to be detachably attached to the second tool-arrangement portions such that the machining tools of the second plurality are removable from the second tool-arrangement portions in a predetermined direction, and the plurality of first tool-arrangement portions and the plurality of second tool-arrangement portions being configured to allow the first and second pluralities of machining tools to be disposed such that centers of the machining tools disposed in the first line and centers of the machining tools disposed in the second line are shifted from each other in a direction extending along the first line and the second line,
      a plurality of first swing portions disposed such that each of the first swing portions of the plurality of first swing portions extends from a side of the second line that is opposite to a side of the second line at which the first line is located, through a respective space that extends in a direction extending along the second line and in which space the second tool-arrangement portions are not disposed, and the first swing portions are each configured to swing in accordance with an attachment-and-detachment operation of the corresponding machining tool to and from the corresponding first tool-arrangement portion,
      a plurality of second swing portions, each second swing portion of the plurality of second swing portions having a respective length shorter than that of the first swing portions, each of the second swing portions disposed so as to extend from the side of the second line that is opposite to the side of the second line at which the first line is located, toward the second tool-arrangement portions, and the second swing portions are each configured to swing in accordance with an attachment-and-detachment operation of the corresponding machining tool to and from the corresponding second tool-arrangement portion,
      a plurality of first detection portions disposed on the side of the second line that is opposite to the side of the second line at which the first line is located, and configured to detect attachment and detachment of the machining tools of the first plurality of machining tools to and from the first tool-arrangement portions, depending on swing operation of the first swing portions, and
      a plurality of second detection portions disposed on the side of the second line that is opposite to the side of the second line at which the first line is located, and configured to detect attachment and detachment of the machining tools of the second plurality of machining tools to and from the second tool-arrangement portions, depending on swing operation of the second swing portions.

8. The machining apparatus according to claim 1, wherein the machining apparatus is configured to cause a pressure booster valve connected to an air compressor, to open a chuck for a machining tool, wherein air is sent to the chuck through the pressure booster valve before the chuck holds the machining tool.

9. The machining apparatus according to claim 1, wherein the machining apparatus is configured to exchange one machining tool for another machining tool of a plurality of machining tools and machine an object, the machining apparatus comprising:
   a control unit configured to select one from among the plurality of machining tools and determine the one as a machining tool to be used,
   wherein the control unit is configured to select a machining tool, from among the plurality of machining tools, which is unbroken and a use time of which is shorter than a predetermined time, and determine the machining tool as a machining tool to be used.

* * * * *